United States Patent
Ono et al.

(10) Patent No.: US 6,715,071 B2
(45) Date of Patent: *Mar. 30, 2004

(54) SYSTEM HAVING DEVICES CONNECTED VIA COMMUNICATION LINES

(75) Inventors: Kenichiro Ono, Atsugi (JP); Yoshikazu Shibamiya, Yokohama (JP); Tatsuya Nakajima, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,509

(22) Filed: Jun. 25, 1999

(65) Prior Publication Data

US 2003/0088798 A1 May 8, 2003

(30) Foreign Application Priority Data

Jun. 26, 1998 (JP) .......................... 10-195118
Jul. 9, 1998 (JP) .......................... 10-208536
Jul. 27, 1998 (JP) .......................... 10-225198
Jun. 23, 1999 (JP) .......................... 11-176759

(51) Int. Cl.⁷ .............................. G06F 9/00
(52) U.S. Cl. ........................ 713/100; 710/302
(58) Field of Search ............... 710/302, 304, 710/104, 10; 713/1, 2, 100

(56) References Cited

U.S. PATENT DOCUMENTS

| 4,958,270 | A | * | 9/1990 | McLaughlin et al. |
| 5,339,445 | A | * | 8/1994 | Gasztonyi |
| 5,535,401 | A | * | 7/1996 | Rawson, III et al. |
| 5,734,818 | A | * | 3/1998 | Kern et al. |
| 5,745,669 | A | * | 4/1998 | Hugard et al. |
| 5,822,581 | A | * | 10/1998 | Christeson |
| 5,901,320 | A | * | 5/1999 | Takahashi et al. |
| 6,021,507 | A | * | 2/2000 | Chen |
| 6,189,106 | B1 | * | 2/2001 | Anderson |
| 6,209,051 | B1 | * | 3/2001 | Hill et al. |

* cited by examiner

*Primary Examiner*—Paul R. Myers
(74) *Attorney, Agent, or Firm*—Fitzpatrick, Cella, Harper & Scinto

(57) ABSTRACT

Log information disappears when a host device storing the log information, which is histories of respective devices under connection, is disconnected. Further, when USB or the like is used as an interface bus, supplied power has to be limited with consideration to the load on the power supply of the host device.

Therefore, here is a proposal of a system that permits succession of the history information of each device even if any device is disconnected and that permits efficient utilization of power.

17 Claims, 22 Drawing Sheets

SYSTEM HAVING DEVICES CONNECTED VIA COMMUNICATION LINES

BACKGROUND OF THE INVENTION

1. Field of the Invention

The present invention relates to a system having a plurality of devices connected via communication lines and, more particularly, to a system in which power is supplied through the communication lines.

2. Related Background Art

There exist conventional systems for data transfer in which a plurality of devices including a hot-plug-connectable device are connected via a power line and a data bus. FIG. 22 is a block diagram to show a configuration example of a bus system according to a conventional example. The conventional bus system has such structure that a plurality of devices A•101 to E•105 are connected via power line 109 and data bus 108. In the figure reference numerals 110, 111 designate plugs connected to an AC 100V power supply. The conventional bus system is configured so that log information, which is history records (records of activities) of the respective devices under system connection, is stored only in the device A•101 which is a host device.

The above conventional technology, however, had the following issue. Specifically, in the conventional bus system, the host was only one device storing the log information being the history records of the respective devices under system connection. This caused such a drawback that the log information disappeared when the host was disconnected during action of the system.

Meanwhile, Universal Serial Bus (USB) and IEEE1394 are drawing attention as interface buses for personal computers. These interfaces incorporate a power line, taking easiness and convenience of connection thereof into account.

However, supplied power also has to be limited with consideration to the load on the power supply of the host device and USB has the current limitation of 5 V and max 500 mA according to the standard thereof. In the USB host device, i.e., on the power supply side, when the load current of USB devices under connection exceeds the aforementioned current limit value, a protection circuit is activated to interrupt the power supply to the USB devices.

The conventional USB devices, however, had the following problem.

Among potential devices as USB devices, there are devices necessitating a large current drain in a short and transient period, though an average power consumption of such devices is low. For example, it occurs upon activation of a motor in a disk device such as a floppy disk drive, during a large sound output in a loudspeaker system incorporating an amplifier, and so on.

Although this transient power is of the short period of time, it is not practical to cover it by a capacitor or the like, because the necessary capacitance thereof is too large. In such cases, therefore, a conceivable countermeasure heretofore was either one of a method of designing the device so as to be active within the range of power supply capability at the expense of performance of the device and a method of giving a higher priority to the performance of the device. However, when the higher priority was given to the performance of the device, the power supply to the device had to be supplied from an outside power other than the USB interface bus and this posed the problem of degrading convenience and simplicity of USB.

For example, when a stereo speaker system using the USB interface is intended to design, the maximum power that can be achieved by the power supply of 5 V and 500 mA (250 mA per channel) is only 625 mW per channel even with no loss. Further, in order to gain the maximum output in an Output Transformer Less (OTL) state, the impedance of the speakers is limited to 20 Ω, which is not a normally practical value, unless a DC-DC converter or the like is used. The maximum power is 3.13 W under the conditions of the power-supply voltage 5V, the impedance 4 Ω of the ordinary speakers, and OTL.

An example of conventional display devices is one as illustrated in FIG. 23.

FIG. 23 is a block diagram to show the structure of the conventional display device.

This display device 612 is provided with hub 512, MPU 513, display part 514, switch 611, and ROM 613.

The hub 512 transmits data from personal computer (PC) 511 to digital camera 517, scanner 518, printer 519, and MPU 513 connected to the hub 512. It also transmits data from digital camera 517, scanner 518, printer 519, and MPU 513 connected to the hub 512, to PC 511.

The digital camera 517 accepts a specification command of photography and image number, a specification command of image data or the like, or data from PC 511 via hub 512 and sends data such as image data or the like and data such as photography conditions or the like to PC 511 via hub 512. The scanner 518 accepts the resolution, position, and range of scan, and commands etc. from PC 511 via the hub 512 and sends image data to PC 511 via hub 512.

The printer 519 accepts a control command and print data from PC 511 via hub 512 to carry out printing and sends the printer status to PC 511 via hub 512.

The MPU 513 accepts various set values of the display part 514 from PC 511 via hub 512 and sends the monitor status to PC 511 via hub 512. It can also accept input of various set values from switch 611 and performs setting of the display part 514 by use of the various set values thus accepted.

The display part 514 undergoes various adjustments from MPU 513 and accepts image data from PC 511 to present a display thereof.

In the case of the conventional display device described above, however, the operation such as the display or printing of image data was not able to be carried out when the display device was in a disconnected state from the computer or when the power of the computer was off.

As described above, the log information disappears when the host device storing the log information being the histories of the respective devices under system connection is disconnected. Further, when the USB or the like is used as an interface bus, the supplied power has to be limited with consideration to the load on the power supply of the host device.

SUMMARY OF THE INVENTION

Therefore, the present invention is directed to a system that permits succession of the history information of each device even if any device is disconnected and that permits efficient utilization of power.

The present invention has been accomplished in view of the above points and an object of the present invention is to provide a system, a control method, and a memory medium that permit succession of the past history information of each device (information of activity records) even if any device is disconnected and that permit efficient utilization of power while suppressing power demand by setting a device with fewer activities in the past into a power saving mode, even if demanded power is over supply.

In order to accomplish the above object, the present invention provides a bus system to which a plurality of devices driven under supply of power can be connected, wherein each of at least two devices out of the said devices comprises memory means for storing history information of each device under connection to the system and control means for altering the history information in the memory means when an alteration occurs in a configuration of the system.

The present invention also provides a bus system to which a plurality of devices driven under supply of power can be connected, wherein each of at least two devices out of the said devices comprises memory means for storing history information of each device under connection to the system and control means for altering the history information in the memory means when an alteration occurs in a configuration of the system and for performing such control that a total demanded power of the devices does not exceed a total supplied power.

In view of the aforementioned problems in the conventional technology, another object of the present invention is to provide a power control apparatus and a power supply control method of USB equipment that can assure the convenience and simplicity of USB without degrading the performance of USB equipment, and also provide a USB apparatus equipped with this power control apparatus.

In order to accomplish the above object, a power control apparatus according to the present invention is a power control apparatus for a driving device to which power is supplied from a power supply device which is subject to current limitation at a predetermined current limit value, the power control apparatus comprising a rechargeable battery, and a charge control part for charging the battery when a current drain is lower than the limit current value, wherein current is supplied from said battery to the driving device when the current drain exceeds the limit current value.

A USB apparatus according to the present invention is a USB apparatus comprising a driving device to which power is supplied from a power supply device which is subject to current limitation at a predetermined current limit value, and a power control device connected to the power supply device via a USB connector and arranged to control power supply to the driving device, wherein the power control device comprises a rechargeable battery, and a charge control part for charging said battery when a current drain is lower than the limit current value and wherein current is supplied from the battery to the driving device when the current drain exceeds the limit current value.

In view of the aforementioned problems in the conventional technology, another object of the present invention is to provide an information processing apparatus, a display control apparatus, a display control method, and a memory medium that permit the operation such as display, printing, or the like even if a computer is disconnected or even if the power of the computer is off.

In order to accomplish the above object, an information processing apparatus according to the present invention comprises means for distributing upstream bus means serially connected to an upstream device, to downstream bus means serially connected to a plurality of downstream devices, wherein when energization from the upstream bus means is present, data from the upstream device is transmitted to the downstream bus means and wherein when the energization from the upstream bus means is absent, said means is connected to an image input/output device connected to the downstream bus means to effect transfer of image data thereto or therefrom.

DETAILED DESCRIPTION OF THE PREFERRED EMBODIMENTS

The embodiments of the present invention will be described with reference to the drawings.

[1] First Embodiment

Figure 1:
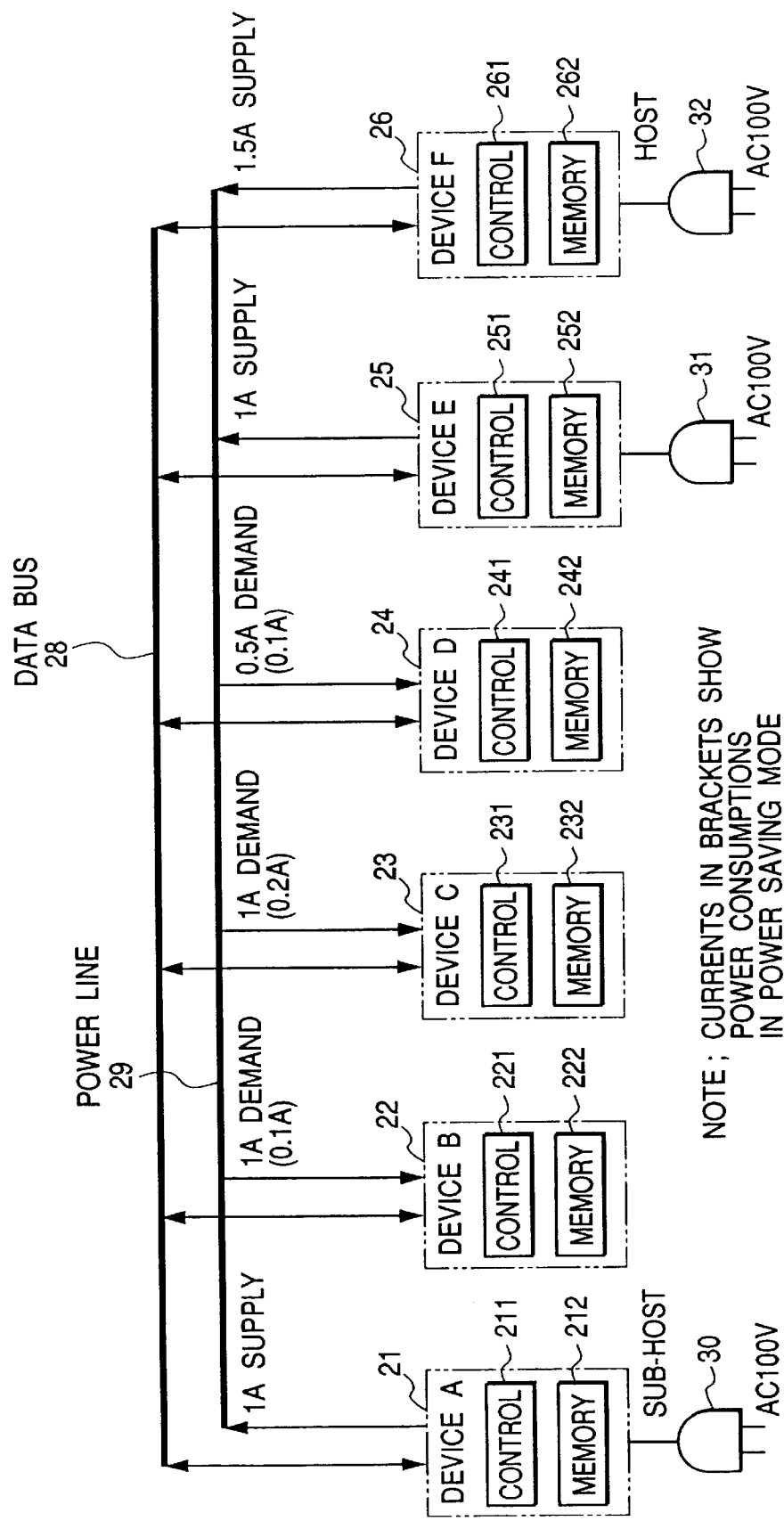
FIG. 1 is a block diagram to show a configuration example of the system according to the first and second embodiments of the present invention.

FIG. 1 is a block diagram to show a configuration example of the system according to the first embodiment of the present invention. The system according to the first embodiment of the present invention is configured in such structure that device A•21, device B•22, device C•23, device D•24, device E•25, and device F•26 are connected via power line 29 and data bus 28. Further, each of the device A•21, device E•25, and device F•26 is equipped with a plug 30, 31, or 32, respectively, to be connected to the AC 100V power supply. It is noted that the configuration shown in FIG. 1 is just an example and that the total number of devices, the number of power supplying devices, the setting of host device and sub-host device, etc. can be designed in a desired configuration, without having to be limited to the illustrated configuration.

Describing the structure of each of the above devices, the device F•26 is set as a host device in the example of the system of FIG. 1 and has a control 261 and a memory 262. The device A•21 is set as a sub-host device in the example of the system of FIG. 1 and has a control 211 and a memory 212. Similarly, the device B•22 has a control 221 and a memory 222, the device C•23 does a control 231 and a memory 232, the device D•24 a control 241 and a memory 242, and the device E•25 a control 251 and a memory 252.

The control of each device carries out a variety of control actions as illustrated in the state transition diagram described hereinafter, including communication with the other devices via the data line 28 (communication for transmission of their own IDs between the devices, communication for transmission to notify that the device is either a host or a sub-host if it is, ordinary data communication, etc.), notification of a value of its power to be supplied to the other devices, to the other devices (if the device is a power supplying device), notification of powers consumed in action and in a power saving mode to the other devices (if the device is a power consuming device), storage of the log information being the history of each device, in the memory (if the device is a host), confirmation of the activity status of each device (if the device is a host), a command for transition of a device whose active time is shorter than the other devices, into the power saving mode (if the device is a host), and so on.

The memory of each device stores its own ID specific thereto, the log information being the history of each device under connection to the system (if the device is a host), and so on. The illustration and description will be omitted for the other elements, for example, such as interface part or the like, than the control and memory in each device, because they are not related directly to the essence of the present invention.

Each of the devices described above is designed according to the following specifications.

(1) Each device has the two-way data line and power line that can be hot-plugged.
(2) Each device has its own ID specific thereto and can communicate with the other devices on the same system via the data line.
(3) Each device can function as a host or as a sub-host capable of recording the log information.
(4) A power supplying device receiving the supply of power from the AC line can supply the power to the other devices, in addition to the power consumed by itself, and can notify the other devices of their values.
(5) A power consuming device that cannot supply the power to itself and that needs to receive supply of power from the other device notifies the other devices of its powers consumed in action and in the power saving mode and, when accepting a command for transition into the power saving mode from the host, moves into the power saving mode.

When devices having the above specifications are connected in an arbitrary combination, at least one of them must be the power supplying device. Let us suppose, for example, that there are six devices connected to the system bus, as illustrated in FIG. 1, and the devices are according to such power specifications as described below.

The device A•21 has the power supply capability of 1 A (ampere) and functions as a sub-host. The device B•22 consumes 1 A in action and 0.1 A in the power saving mode. The device C•23 consumes 1 A in action and 0.2 A in the power saving mode. The device D•24 consumes 0.5 A in action and 0.1 A in the power saving mode. The device E•25 has the power supply capability of 1 A. The device F•26 has the power supply capability of 1.5 A and functions as a host. The data buses 28 of the devices are connected to each other while the power lines 29 of the devices are also connected to each other. In this case, the total power consumption in action is 2.5 A and the total supplied power is 3.5 A; therefore, the power supply capability is sufficient even if all the devices become active at one time.

Here the procedures up to completion of the configuration of the system of FIG. 1 will be described below.

In a state in which no device is connected, one device is connected to the data bus 28 and the power line 29 illustrated in FIG. 1.

When this device thus connected is either the device B•22, the device C•23, or the device D•24, there occurs no change, because it is a device that cannot supply power.

Figure 5:
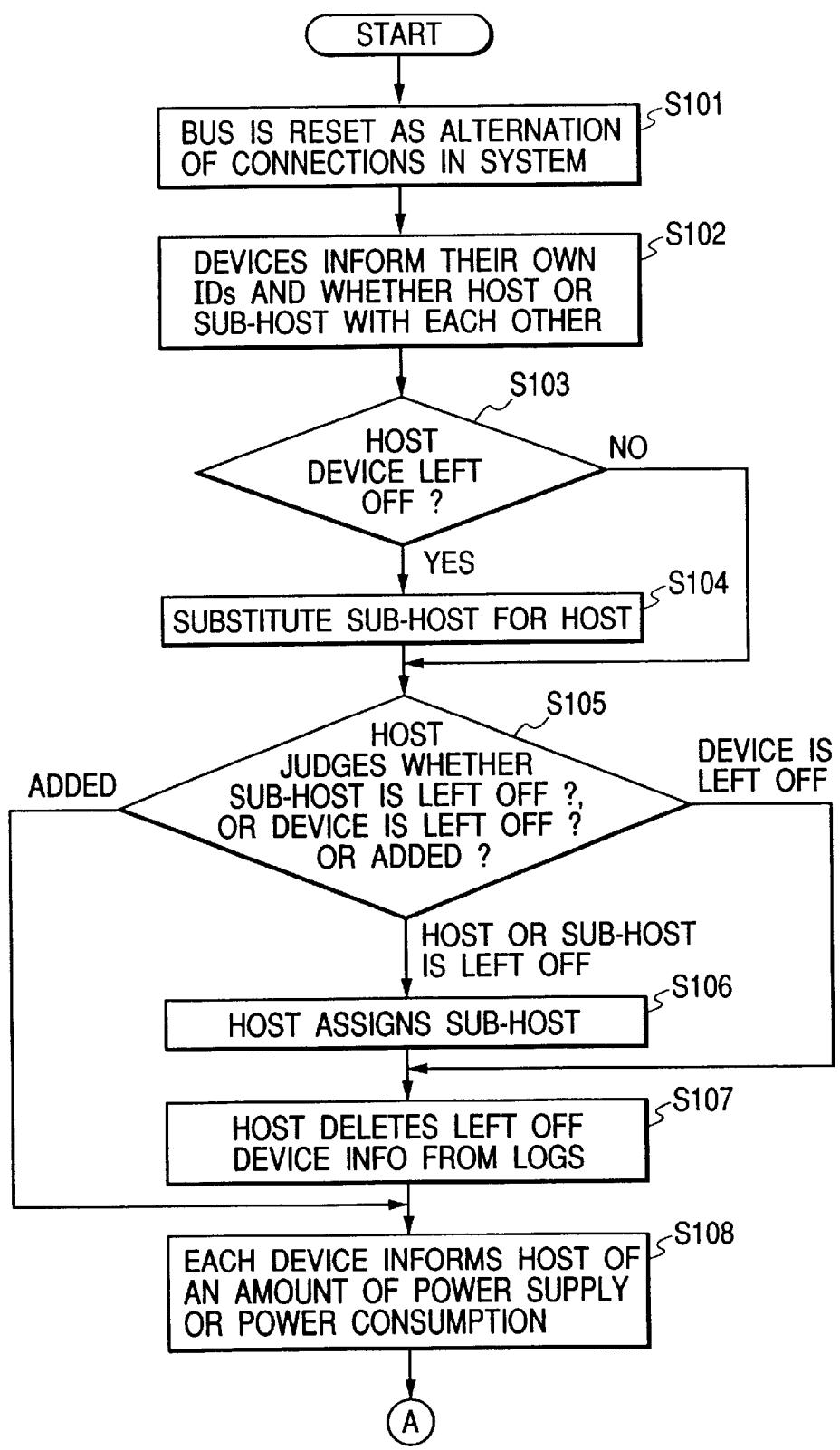
FIGS. 5, 6, 7, 8, 9 and 10 are action flowcharts according to the first and second embodiments of the present invention.
Figure 6:
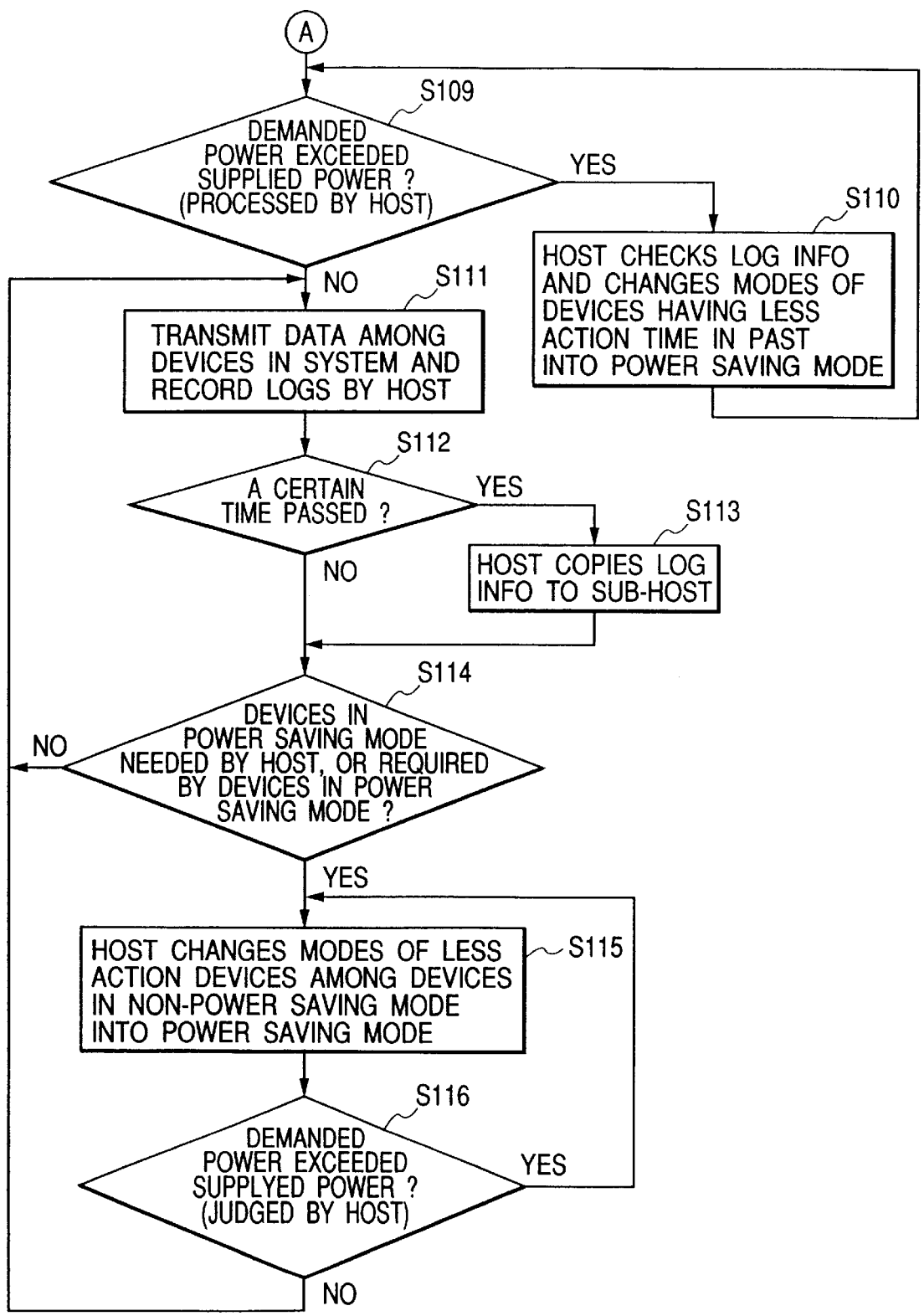

When the device thus connected is either the device A•21, the device E•25, or the device F•26, the power is supplied and, therefore, the processing illustrated in FIG. 5 and FIG. 6 will be initiated. Let us suppose herein that the device F•26 was connected.

In step S102, the device F•26 becomes a host, because there is no other device with power supply capability connected.

In step S105, because there is no sub-host, the flow moves to step S106. If a device without power supply capability is connected, in addition to the device F•26, to the system (for example, if the device B•22 is connected), it is designated as a sub-host. If there is no other device connected the designation of the sub-host is not carried out.

Then the processing of step S108 and after is carried out and like processing is carried out with addition of another device, thereby constructing the system illustrated in FIG. 1.

The processing with addition of another device will be detailed hereinafter.

Next described are actions in the system according to the first embodiment of the present invention, constructed as described above, (1) where the host is left off from the system connection, (2) where the sub-host is left off from the system connection, (3) where a device is left off from the system connection, and (4) where a device is added to the system connection.

(1) Action Carried Out Where the Host is Left Off from the System

A sequence of action carried out where the device F•26 having the power supply capability of 1.5 A and the host function is left off from the connection to the system in the configuration shown in FIG. 1 will be described referring to the action flowchart of FIG. 5 and FIG. 6. Since the device F•26 is left off, an alteration occurs in the system facilities and the bus is thus reset (step S101). Each of the devices notifies the other devices of its own ID and that it is either a host or a sub-host if it is (step S102). In this example, since the device F•26 being the host is left off (step S103), the flow goes to step S104. In this step, since there is no sending of ID etc. from the device F•26 being the host, the device A•21 now being the sub-host recognizes the device F•26 of the current host as the left-off device and the device A•21 being the sub-host turns into the host (step S104).

The device A•21, having turned into the host, judges which system alteration was made among leaving-off of the host or the sub-host, leaving-off of a device, and addition of a device (step S105). Since the host was left off in this example, the flow goes to step S106. The device A•21 having turned into the host designates the device B•22 as a sub-host (step S106). Further, the device A•21 now being the host deletes the information of the device F•26 from the log information in the memory 212 (step S107). Each power supplying device with power supply capability out of the other devices than the host reports a value of its power supply capability to the host and each power consuming device reports its powers consumed in action and in the power saving mode to the host (step S108).

Figure 2:
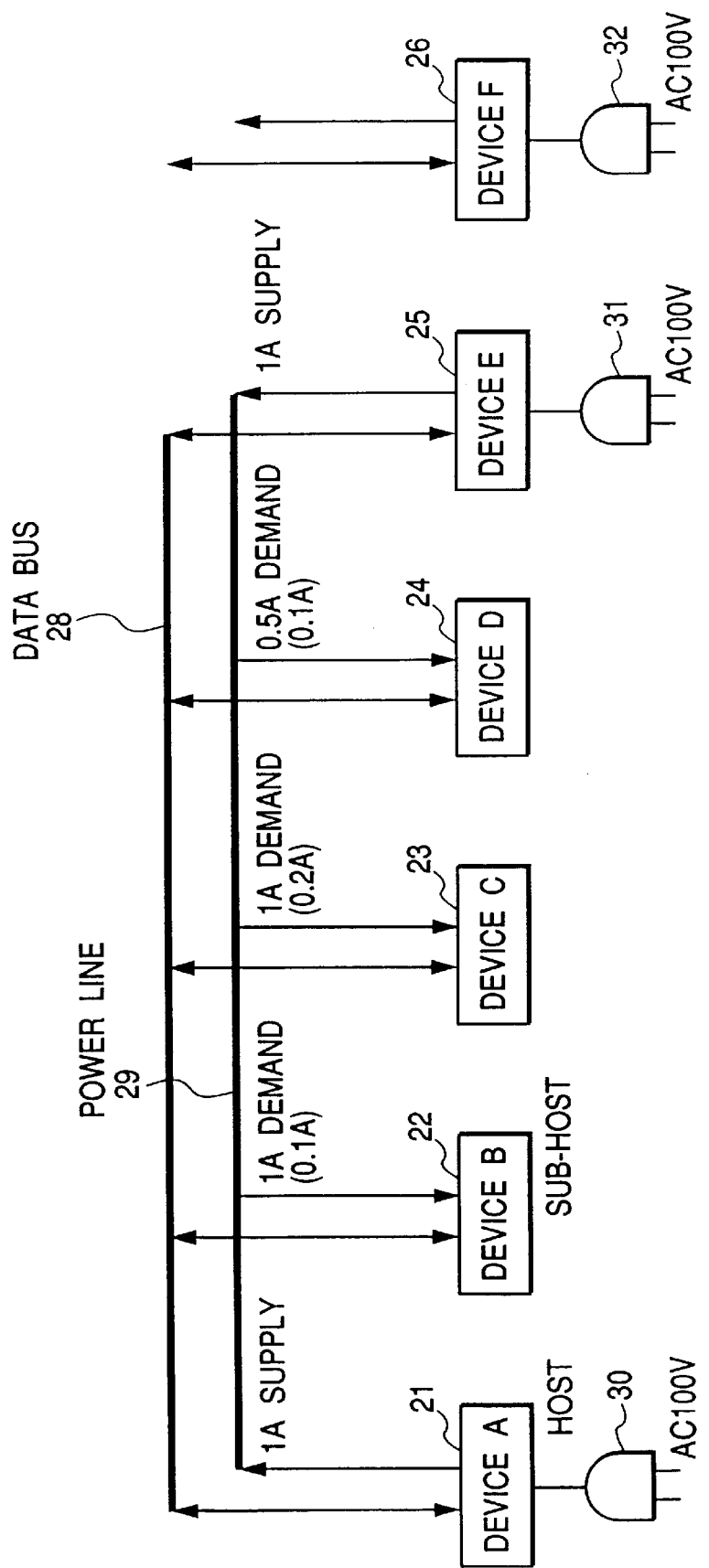
FIG. 2 is a block diagram to show another configuration example of the system according to the first embodiment of the present invention.

Let us suppose herein an example in which the device F•26 was left off as described above and the other five devices A•21, B•22, C•23, D•24, and E•25 connected to the system bus, illustrated in above FIG. 1, turned into the following configuration. Specifically, it is assumed that the device A•21 has the host function with the power supply capability of 1 A, the device B•22 has the sub-host function to consume 1 A in action and 0.1 A in the power saving mode, the device C•23 consumes 1 A in action and 0.2 A in the power saving mode, the device D•24 consumes 0.5 A in action and 0.1 A in the power saving mode, and the device E•25 has the power supply capability of 1 A. The system configuration of this example is illustrated in FIG. 2.

In the above configuration the total power consumption during action is 2.5 A and the total supplied power is 2 A; therefore, the power supply capability is insufficient when all the devices become active at one time (step S109). Then the device A•21, having turned into the host, investigates the last logs during the connection of the device F•26 to the system, out of the memory 212 and checks activity conditions of the respective devices. For example, supposing the active time of the device C•23 was shorter than those of the other devices, the device A•21 of the host gives the device C•23 a command to move into the power saving mode. After this processing, the total power consumption becomes 1+0.2+0.5=1.7 A, which is below 2 A of the supplied power (step S110).

Since the demanded power becomes below the supplied power, each device in the system starts its activity to go into the normal action mode to transfer data to each other and the device A•21 of the host stores the log information as histories of the respective devices in the memory 212 (step 511). Further, after an internal timer (not illustrated) counts a lapse of a certain period of time and when there is no data transfer in the system (step S112), the device A•21 of the host transfers a copy of the log information to the device B•22 of the sub-host (step S113).

When in the active mode the device A•21 of the host intends to use the device C•23, or when the device C•23 sends a request for activity, an interrupt request to notify the request for activity is given (step S114). On that occasion, the device A•21 of the host references the past log records in the memory 212 to turn the least active device out of the power consuming devices into the power saving mode (step S115). This operation is repeatedly carried out before the supplied power becomes over the demanded power with activation of the device C•23 (step S116). Once the supplied power becomes over the demanded power, the device C•23 is released from the power saving mode and goes into the active mode (step S111).

(2) Action Carried Out Where the Sub-host is Left Off from the System Connection A sequence of action carried out where the device A•21 of the sub-host is left off from the connection to the system in the configuration illustrated in above FIG. 1 will be described referring to the action flowchart of FIG. 5 and FIG. 6. Since the device A•21 is left off, an alteration occurs in the system facilities, and the bus is thus reset (step S101). Each device notifies the other devices of its own ID and that it is either a host or a sub-host if it is (step S102). Since the host is not left off in this example (step S103), the flow proceeds to step S105.

On the occasion of the system alteration, the device F•26 of the host determines whether the system alteration was leaving-off of the host or the sub-host, leaving-off of a device, or addition of a device (step S105). Since the sub-host was left off in this example, the flow proceeds to step S106. The device F•26 of the host designates the device B•22 as a sub-host (step S106). Further, the device F•26 of the host deletes the information of the device A•21 from the log records in the memory 262 (step S107). The processing thereafter is similar to that in the above case (1) and the description thereof is thus omitted herein.

(3) Action Carried Out Where a Device is Left Off from the System Connection

A sequence of action carried out where the device B•22 is left off from the connection to the system in the configuration illustrated in above FIG. 1 will be described referring to the flowchart of FIG. 5 and FIG. 6. Since the device B•22 was left off, an alteration occurs in the system facilities and the bus is thus reset (step S101). Each device notifies the other devices its own ID and that it is either a host or a sub-host if it is (step S102). Since the host is not left off in this example (step S103), the flow moves to step S105.

On the occasion of the system alteration, the device F•26 of the host determines whether the system alteration was leaving-off of the host or the sub-host, leaving-off of a device, or addition of a device (step S105). Since the device F•26 determines that a device was left off, the flow goes to step S107. The device F•26 of the host deletes the information of the device B•22 from the log records in the memory 262 (step S107). The processing thereafter is similar to that in the above case (1) and the description thereof is omitted herein.

(4) Action Carried Out Where a Device is Added to the System Connection

Figure 3:
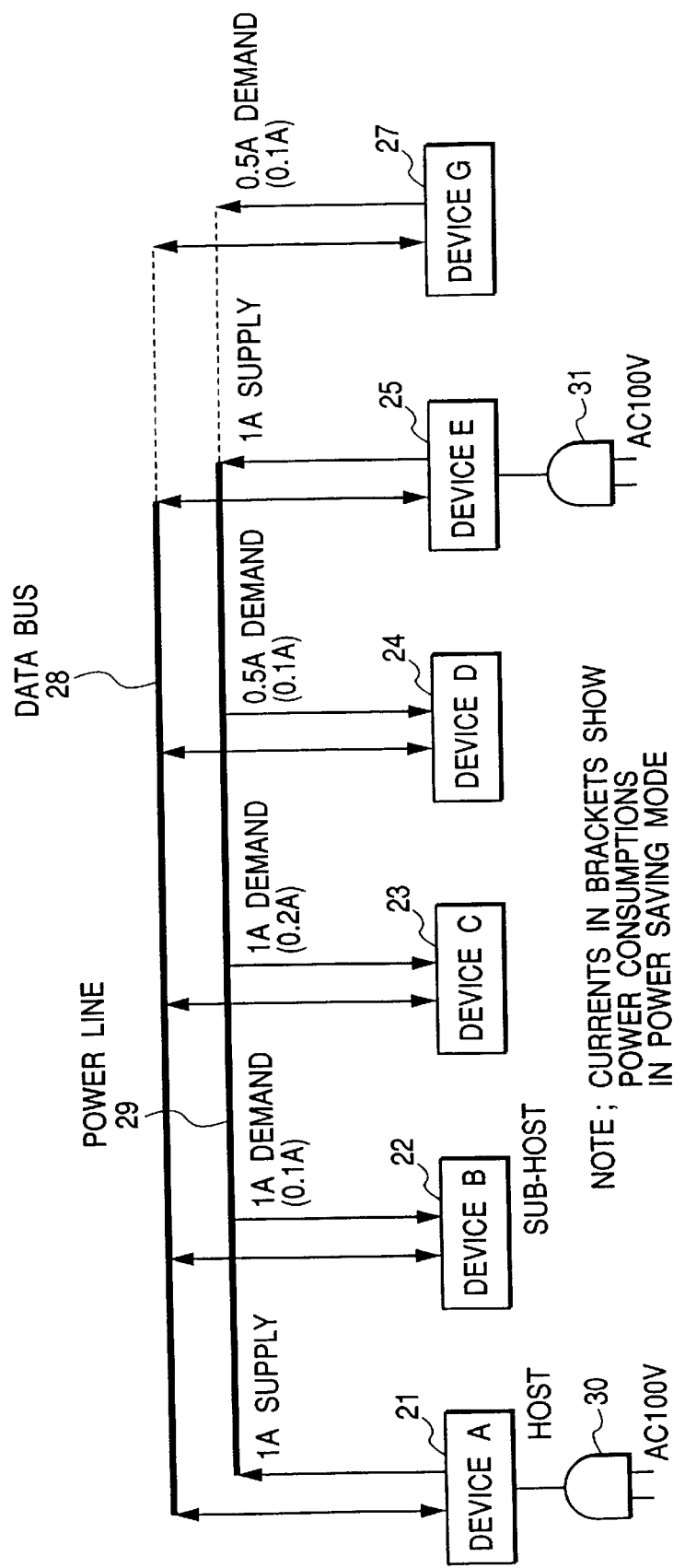
FIG. 3 is a block diagram to show another configuration example of the system according to the first embodiment of the present invention.

Let us assume that the device G•27 which consumes 0.5 A in action and 0.1 A in the power saving mode is added to the configuration illustrated in above FIG. 2 (the state without the device F•26). The system configuration in this case is illustrated in FIG. 3. Since the device G•27 was added, an alteration occurs in the system facilities and the bus is thus reset (step S101). Each device notifies the other devices of its own ID and that it is either a host or a sub-host if it is (step S102). Since the host is not left off in this example (step S103), the flow proceeds to step S105.

On the occasion of the system alteration, the device A•21 of the host determines whether the system alteration is leaving-off of the host or the sub-host, leaving-off of a device, or addition of a device (step S105). Since the device A•21 determines that the device was added, the flow moves to step S108. Each power supplying device with power supply capability out of the devices except for the host reports a value of its power supply capability to the host and each power consuming device reports its powers consumed in action and in the power saving mode to the host (step S108).

Let us assume herein that the device G•27 was added as described above and that the six devices A•21, B•22, C•23, D•24, E•25, and G•27 connected to the system bus as illustrated in above FIG. 3 are in the following configuration. Specifically, it is assumed that the device A•21 has the host function with the power supply capability of 1 A, the device B•22 has the sub-host function to consume 1 A in action and 0.1 A in the power saving mode, the device C•23 consumes 1 A in action and 0.2 A in the power saving mode, the device D•24 consumes 0.5 A in action and 0.1 A in the power saving mode, the device E•25 has the power supply capability of 1 A, and the device G•27 consumes 0.5 A in action and 0.1 A in the power saving mode.

Since in the above configuration the total power consumption during action is 3 A and the total supplied power is 2 A, the power supply capability becomes insufficient when all the devices become active at one time (step S109). Then the device A•21 of the host investigates the last logs from the memory 212 and checks the activity conditions of the respective devices. For example, supposing the active time of the device C•23 was shorter than those of the other devices, the device A•21 of the host gives the device C•23 a command for entry into the power saving mode. After this processing, the total power consumption becomes 1+0.2+0.5+0.5=2.2 A, which is still over 2 A of the supplied power (step S109). Therefore, the flow returns to step S110.

Figure 4:
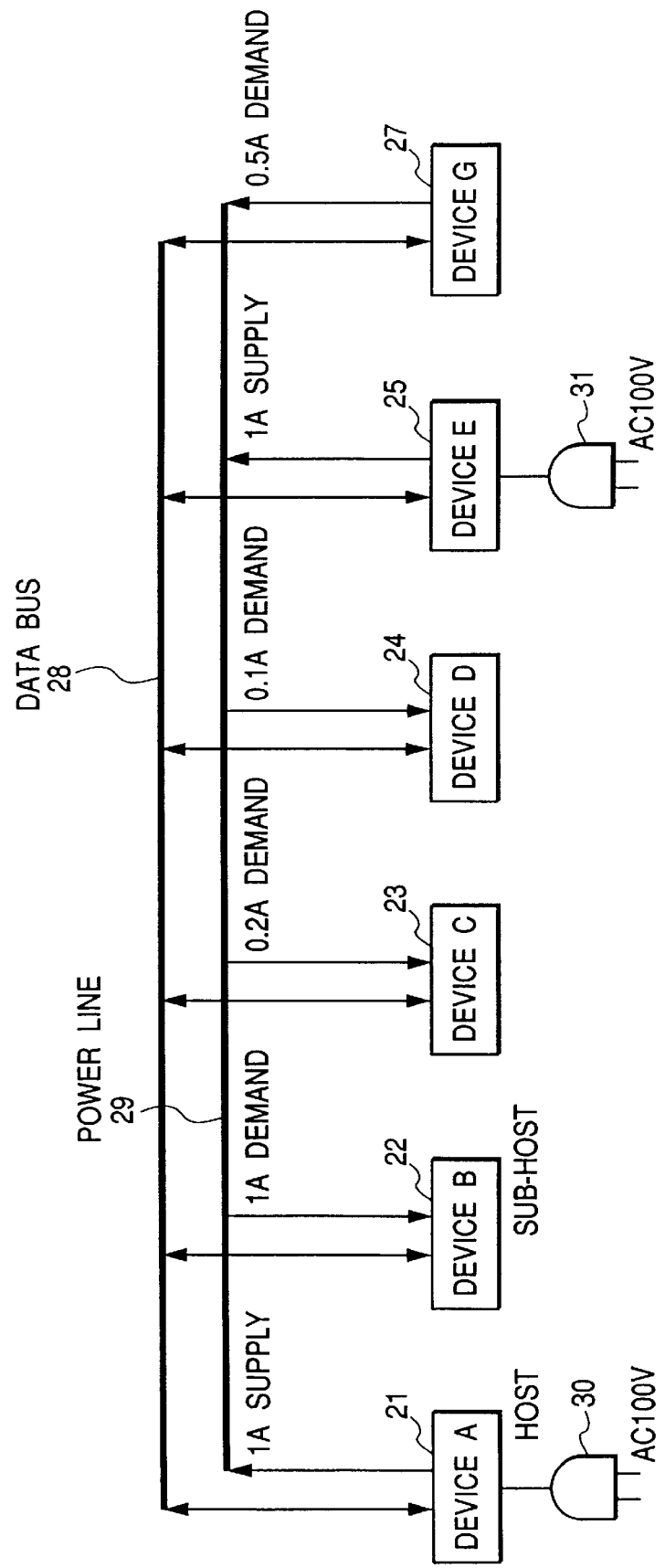
FIG. 4 is a block diagram to show another configuration example of the system according to the first embodiment of the present invention.

Further, the device A•21 of the host investigates the last logs out of the memory 212 and finds out a device of the next shortest active time to the device C•23. Since in this example the device D•24 has the next shortest active time, the host gives it a command for entry into the power saving mode (step S110). After this processing, the total power consumption becomes 1+0.2+0.1+0.5=1.8 A, which is below 2 A of the supplied power (step S109). Therefore, the flow goes to step S111. The system configuration in this case is illustrated in FIG. 4.

Since the demanded power becomes smaller than the supplied power, the devices in the system start their activities and go into the normal action mode to transfer the data to each other, and the device A•21 of the host stores the log information as histories of the respective devices in the memory 212 (step S111). Further, after the predetermined period of time has elapsed by the internal timer (not illustrated) and when there is no data transfer in the system (step S112), the device A•21 of the host transfers a copy of the log information to the device B•22 of the sub-host (step S113).

When in the action mode the device A•21 of the host intends to use the device C•23, or when the device C•23 sends a request for action, an interrupt request to notify the request for action is given (step S114). On that occasion, the device A•21 of the host references the past log records to turn the least active device out of the power consuming devices into the power saving mode (step S115). This is repeatedly carried out before the supplied power becomes over the demanded power with activation of the device C•23 (step S116). Once the supplied power becomes over the demanded power, the system goes into the action mode (step S111).

Here the actions in the respective devices will be described.

Figure 7:
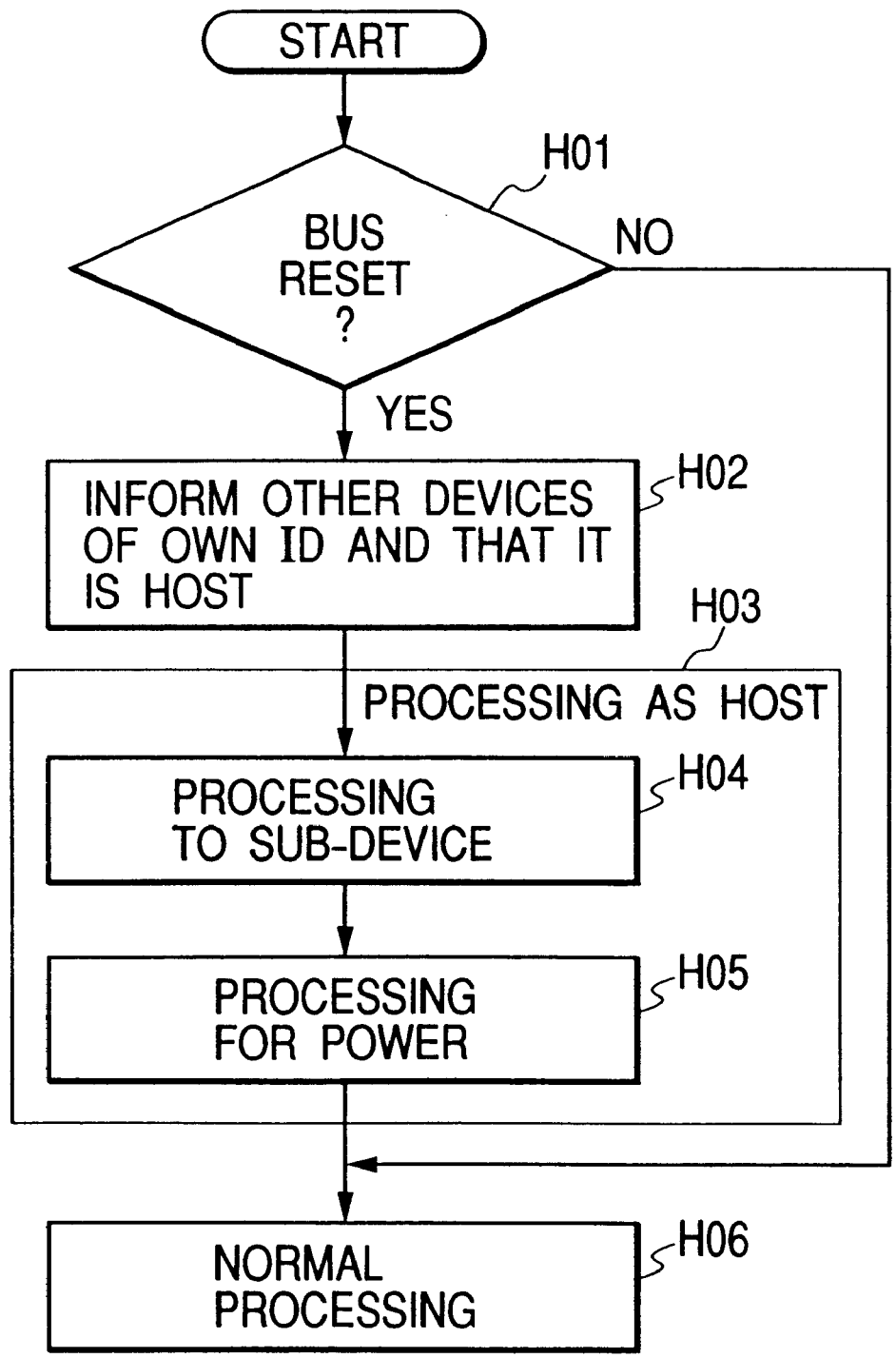

FIG. 7 is a flowchart to show the action in the host device. First, when the bus reset occurs (step H01), as in step S101 (FIG. 5), the host notifies the other devices of its ID and that it is the host (step H02).

Then the host carries out the processing as a host, based on notification from the other devices (step H03). This processing includes the processing for the sub-device (step H04), the processing concerning the power (step H05), etc., the details of which are as described above.

After that, the host carries out the normal processing action as a device (step H06).

Figure 8:
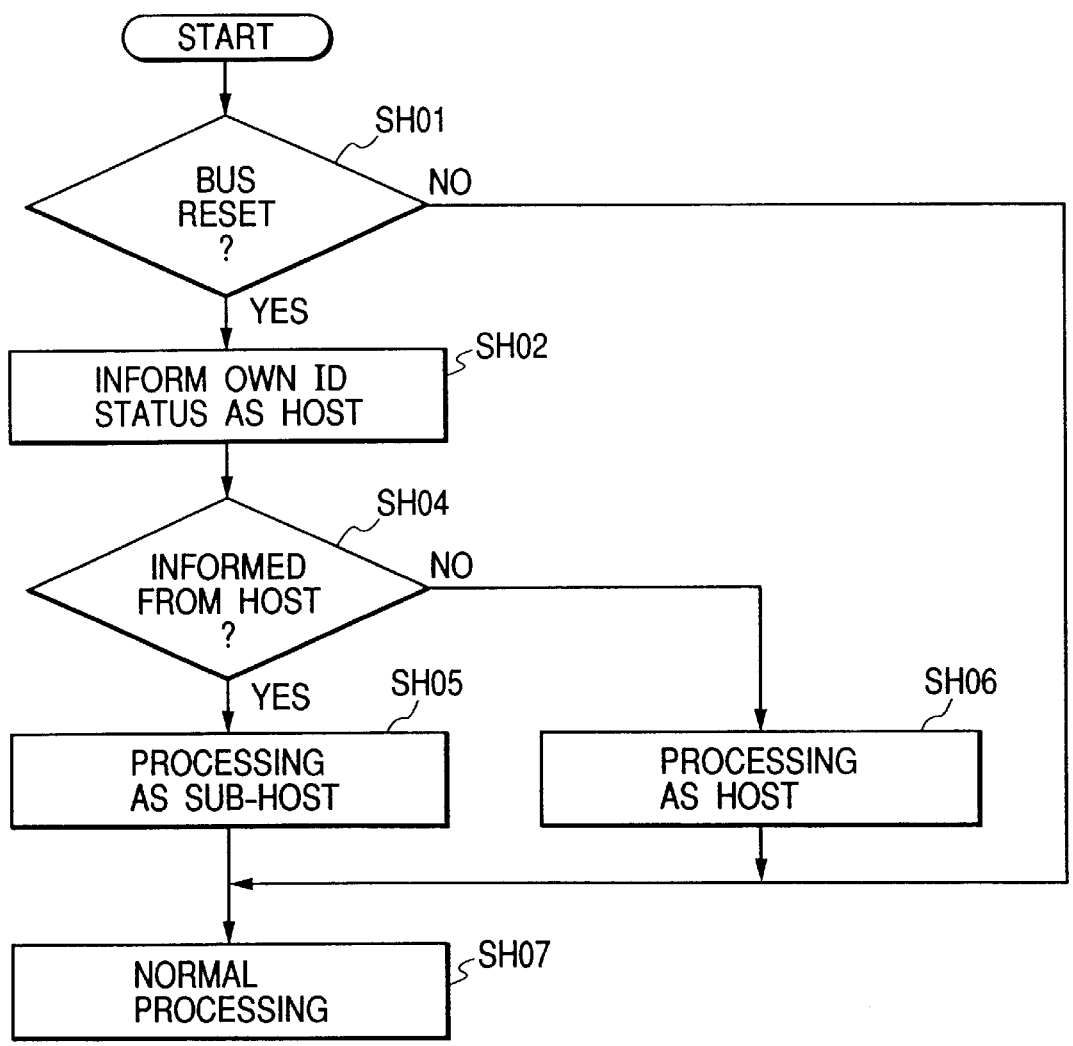

FIG. 8 is a flowchart to show the action in the sub-host. First, when the bus reset occurs (step SH01), as in step S101 (FIG. 5), the sub-host notifies the other devices of its ID and that it is the sub-host (step SH02).

Then the sub-host awaits notification from the host (step SH04). When it receives the notification, it carries out the processing as a sub-host (step SH05). If it receives no notification, it carries out the processing as a host (step SH06). The details of the processing are as described above.

After that, the sub-host performs the normal processing action as a device (step SH07).

Figure 9:
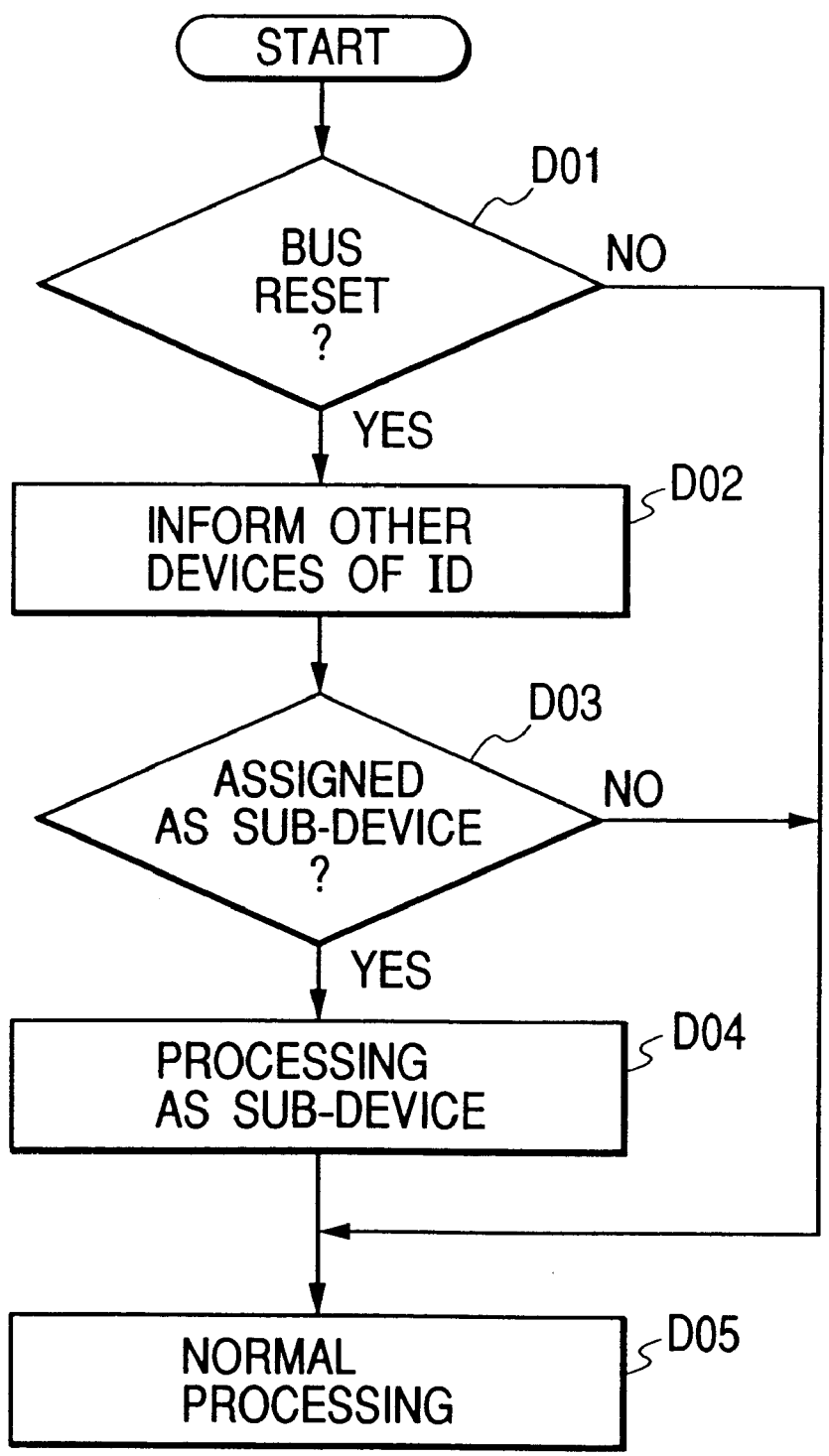

FIG. 9 is a flowchart to show the action in the other devices than the host and the sub-host.

First, when the bus reset occurs (step D01), as in step S101 (FIG. 5), the device notifies the other devices of its ID (step D02).

Then it is determined whether the host designates the device as a sub-host (step D03). When it is designated as a sub-host, it carries out the processing as a sub-host (step D04). When it is not designated as a sub-host, it carries out the normal processing action (step D05). The details of the processing are as described above.

The above-stated processing procedures illustrated in FIG. 7 to FIG. 9 are preliminarily stored in the memory of each device in order to make all the devices ready for the processing.

As described above, the system according to the first embodiment of the present invention is so configured that each of the device A•21 to the device F•26 can have the function of the host or the sub-host, that each of these device A•21 to device F•26 has the memory 221 to 226 for storing the history information of each device under connection to the system and the control 211 to 216 for changing the history information in the memory with occurrence of an alteration in the system configuration and for performing such control that the total demanded power of the devices does not exceed the total supplied power, that if the device of the host is disconnected from the system connection the device of the sub-host itself becomes a new host and designates a new sub-host, and that if the device of the sub-host is disconnected from the system connection the host designates a new sub-host; therefore, the system of the first embodiment has the operation and effect as described below.

In the above configuration, when the device of the host is disconnected from the system connection, each device notifies the other devices of its own ID and that it is either a host or a sub-host if it is. The device of the sub-host becomes a new host and the device of the new host selects a new sub-host. Each device with power supply capability out of the other devices than the host reports a value of its power supply capability to the host and each power consuming device reports its powers consumed in action and in the power saving mode to the host. The device having become the host deletes the information of the disconnected device from the log records in the memory. The device having become the host controls each device so that the total demanded power of the devices does not exceed the total supplied power.

When the sub-host is disconnected from the system connection, each device notifies the other devices of its own ID and that it is either a host or a sub-host if it is. The device of the host selects a new sub-host, because the sub-host was disconnected. Each device with power supply capability out of the other devices than the host reports a value of its power supply capability to the host and each power consuming device reports its powers consumed in action and in the power saving mode to the host. The device of the host deletes the information of the disconnected device from the log records in the memory. The device of the host controls each device so that the total demanded power of the devices does not exceed the total supplied power.

When a device is disconnected from the system connection, each device notifies the other devices of its own ID and that it is either a host or a sub-host if it is. Each device with power supply capability out of the other devices than the host reports a value of its power supply capability to the host and each power consuming device reports its powers consumed in action and in the power saving mode to the host. The device of the host deletes the information of the disconnected device from the log records in the memory. The device of the host controls each device so that the total demanded power of the devices does not exceed the total supplied power.

When a device is added to the system connection, each device notifies the other devices of its own ID and that it is either a host or a sub-host if it is. Each device with power supply capability out of the devices than the host reports a value of its power supply capability to the host and each power consuming device reports its powers consumed in action and in the power saving mode to the host. The device of the host controls each device so that the total demanded power of the devices does not exceed the total supplied power.

Accordingly, the first embodiment of the present invention is arranged to store the history information of each device in the host and in the sub-host on the system, whereby it has the effect of capability of succeeding to the past history information of each device even if any device is disconnected from the connection by hot plug. Even in the case where the demanded power is over the supply, the power demand can be suppressed by turning the least active device in the past into the power saving mode, which presents the effect of capability of efficiently utilizing the power.

[2] Second Embodiment

The system according to the second embodiment of the present invention is constructed, for example, in such a configuration that a plurality of device A•21, device B•22, device C•23, device D•24, device E•25, and device F•26 are connected via power line 29 and data bus 28, similar to the configuration of the first embodiment described above (reference is made to above FIG. 1). It is noted that the configuration illustrated in above FIG. 1 is only an example and that the total number of devices, the number of power supplying devices, setting of the host and the sub-host, etc. can be determined according to a desired configuration, without having to be limited to the illustrated configuration.

The device A•21 has the control 211 and memory 212, the device B•22 does the control 221 and memory 222, the device C•23 the control 231 and memory 232, the device D•24 the control 241 and memory 242, the device E•25 the control 251 and memory 252, and the device F•26 the control 261 and memory 262. Since the functions of the control and memory of each device were detailed in the first embodiment above, the description thereof is thus omitted herein.

Next described are the actions of the system according to the second embodiment of the present invention in the configuration as described above. In this example the host or the sub-host does not go into the power saving mode and, therefore, these are desirably power supplying devices. Since at least one of the devices in the system must be a power supplying device, the system can be set so that the host is a power supplying device. The following description will be given referring to the action flowcharts of FIG. 5 and FIG. 10.

Since a device is left off or added, an alteration occurs in the system facilities and the bus is thus reset (step S101). Each device notifies the other devices of its own ID and that it is either a host or a sub-host if it is, each power supplying device with power supply capability reports a value thereof, and each power consuming device reports its powers consumed in action and in the power saving mode (step S102 in FIG. 5; step S602 in FIG. 10). When the device of the host is left off (YES in step S103), the flow goes to step S104. When the device of the host is not left off (NO in step S103), the flow proceeds to step S105. When the device of the sub-host detects that the device left off is the host, the sub-host becomes a new host (step S104).

Figure 10:
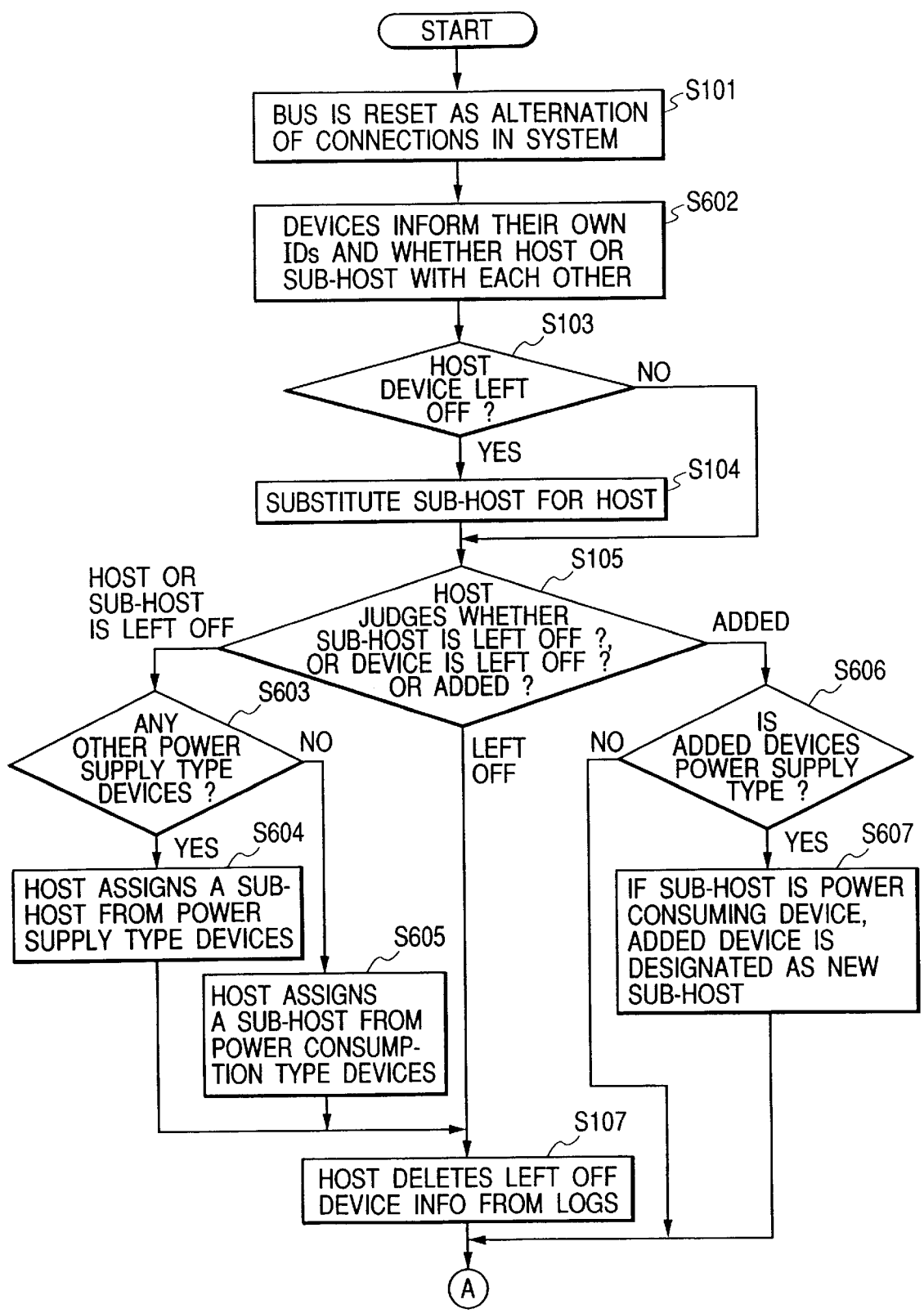

On the occasion of the system alteration, the device having turned into the new host determines whether the system alteration was leaving-off of the host or the sub-host, leaving-off of a device, or addition of a device (step S105). In the case of FIG. 10, when the host or the sub-host is left off, it is determined whether there exists another power supply type device (step S603). When there exists another power supply type device, the flow proceeds to step S604. When there exists no power supply type device, the flow proceeds to step S605. When there exist other power supply type devices, the host selects a sub-host from the power supply type devices (step S604) and moves to step S107. When there exists no other power supply type device, the host designates a sub-host out of power consumption type devices (step S605) and moves to step S107. The host deletes the information of the left-off device from the log records in the memory (step S107).

When it is determined in above step S105 that a device was left off, the flow proceeds to step S107 in both FIG. 5 and FIG. 10. In FIG. 10, when it is determined in above step S105 that a device was added, it is determined whether the device thus added is a power supply type device (step S606). When the added device is a power supply type device, the flow goes to step S607. When the added device is not a power supply type device, the flow goes to step S109. When the added device is a power supply type device and if the sub-host at present is a power consumption type device, the added device is designated as a new sub-host; if not the configuration is not changed (step S607) and the flow then goes to step S109 of FIG. 6.

In FIG. 6, the host compares the demanded power during action with the supplied power (step S109). If the supplied power is insufficient the flow goes to step S110. If sufficient the flow goes to step S111. When the demanded power exceeds the supplied power, the host investigates the last logs in the memory to check the activity conditions of the respective devices. For example, supposing an active time of a certain device is shorter than those of the other devices, the device of the host gives the device a command for entry into the power saving mode (step S110). After this processing, the total power consumption becomes lower than before and the flow thus returns to above step S109 to determine whether the demanded power exceeds the supplied power.

When the demanded power becomes smaller than the supplied power, the devices in the system go into the normal action mode to start their activities and transfer data to each other, and the host stores the log information as histories of the respective devices in the memory (step S111). Further, after the fixed time has elapsed by the internal timer (not illustrated) and when there is no data transfer in the system (step S112), the host transfers a copy of the log information to the sub-host (step S113).

When in the action mode the device of the host intends to use a device in the power saving mode, or when a device in the power saving mode sends a request for activity, an interrupt request to notify the request for activity is given (step S114). On that occasion, the device of the host references the past log records in the memory to force the least active device out of the power consuming devices into the power saving mode (step S115). This is repeatedly carried out before the supplied power becomes over the demanded power with activation of the device (step S116). Once the supplied power becomes over the demanded power, the system moves into the action mode (step S111).

Here the processing in each device is carried out as described above referring to FIG. 7 to FIG. 9.

As described above, the system according to the second embodiment of the present invention is so configured that each of the device A•21 to device F•26 can have the function of the host or the sub-host, that each of these device A•21 to device F•26 has the memory 221 to 226 for storing the history information of each device under connection to the system and the control 211 to 216 for altering the history information in the memory when an alteration occurs in the system configuration and for performing such control that the total demanded power of the devices does not exceed the total supplied power, that if the device of the host is disconnected from the system connection the device of the sub-host itself becomes a new host and designates a new sub-host, that if the device of the sub-host is disconnected from the system connection the host designates a new sub-host, and that the host is the power supplying device; therefore, the system of the second embodiment has the operation and effect described below.

In the above configuration, when a device (the device of the host, the device of the sub-host, or an ordinary device) is disconnected from the system connection, or when a device is added to the system connection, each device notifies the other devices of its own ID and that it is either a host or a sub-host if it is, each device with power supply capability reports a value of its power supply capability, and each power consuming device reports its powers consumed in action and in the power saving mode. When the host or the sub-host is disconnected, if there are other power supply type devices a sub-host is selected from the power supply type devices; if there is no other power supply type device a sub-host is selected from the power consumption type devices. When a device is added, if the added device is a power supply type device and if the sub-host is of the power consumption type the added device is then selected as a new sub-host. The device of the host stores the log information of each device in the memory. The device of the host controls each device so that the total demanded power of the devices does not exceed the total supplied power.

Accordingly, the second embodiment of the present invention has the effect of capability of succeeding to the past history information of each device even if any device is disconnected from the connection by hot plug, as in the first embodiment described previously, because it has the configuration in which the host and the sub-host on the system store the history information of each device. Further, even if the demanded power is over the supply, the power demand can be suppressed by changing the least active device in the past into the power saving mode, which presents the effect of capability of efficiently utilizing the power.

[3] Third Embodiment

Figure 11:
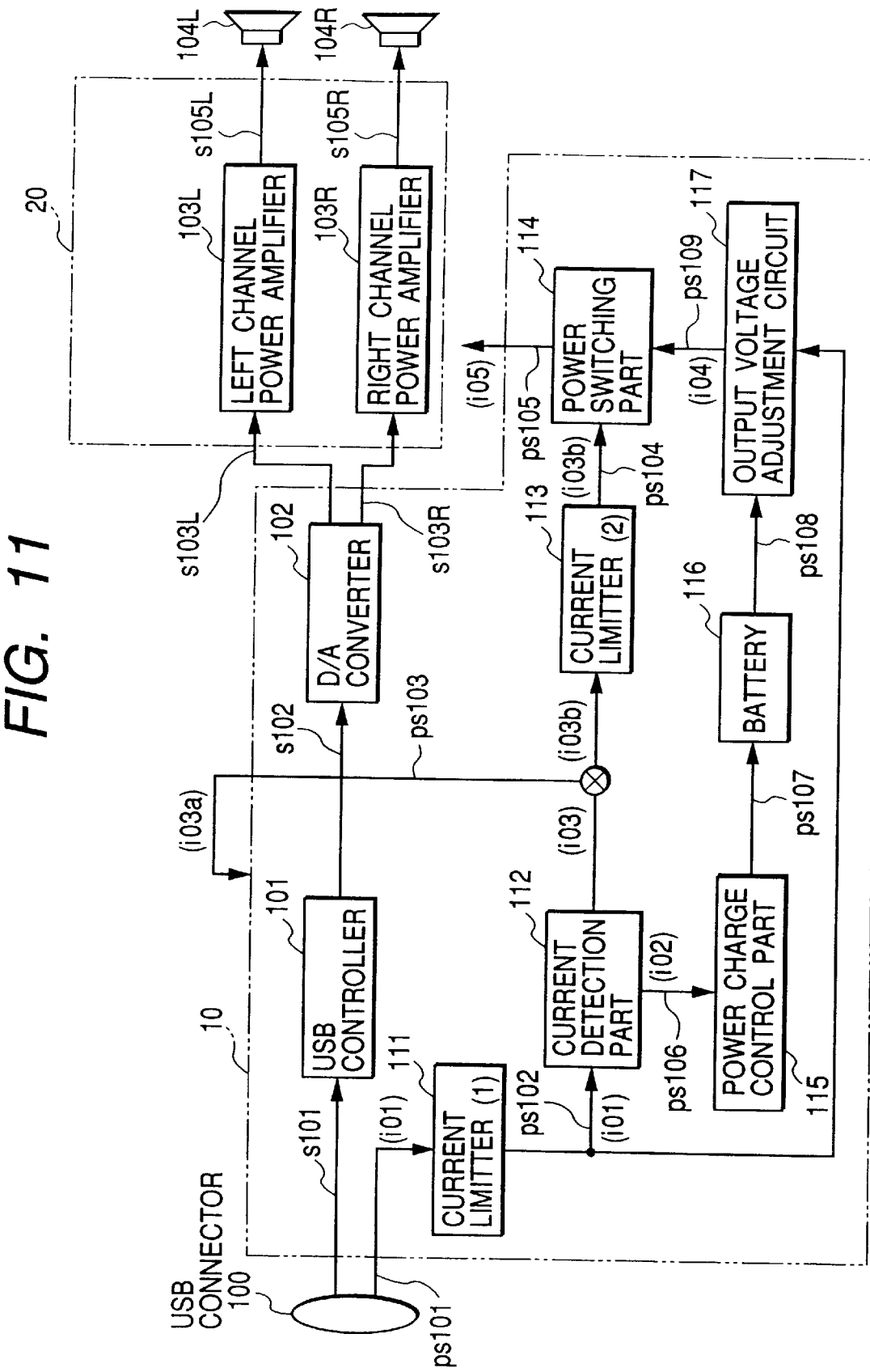
FIG. 11 is a block diagram to show an overall configuration of USB equipment according to the third embodiment of the present invention.

FIG. 11 is a block diagram to show the overall configuration of USB equipment according to the third embodiment of the present invention.

The USB equipment of the present invention is configured as an amplifier-integrated loudspeaker device. This amplifier-integrated loudspeaker device receives a digital sound signal via a USB connector from a host computer such as a personal computer (PC), a workstation (WS), or the like, converts this sound signal to an analog signal, further amplifies it, and reproduce the signal by loudspeakers.

This amplifier-integrated loudspeaker device is composed of power control block 10, power block 20, left channel speaker 104L, and right channel speaker 104R. (It is noted that this device may be an example of the device that cannot supply the power to the other devices, for example, described in FIG. 1.)

In the figure reference numeral 100 designates a USB connecter, to which USB signal line s101 and power line ps101 are assigned. In the power control block 10, reference numeral 101 denotes a USB controller, which sends and receives data to and from the host computer via USB signal line s101 and which separates voice data from the data to output it to digital voice signal line s102.

Numeral 102 represents a D/A converter, which accepts input of the digital sound signal s102 and which outputs stereo audio analog signals of two left and right channels s103L, s103R.

Symbols 103L, 103R are power amplifiers for audio, which receive the respective audio analog signals s103L, s103R and which amplify the signals to respective powers enough to drive the loudspeakers 104L and 104R described hereinafter and output the amplified signals to signal lines s105L, s105R.

Symbols 104L, 104R are loudspeakers, which receive the supply of power via power line ps105, which accept input of the electric sound signals through the signal lines s105L, s105R, and which convert the signals to air vibration to generate sound.

Numeral 111 denotes a current limiter (1), which limits the power-supply current inputted through the power line ps101 from the USB connector 100. This is set at a value iL1 a little smaller than the maximum power-supply current 500 mA, which is the standard of USB.

Numeral 112 designates a current detection part, which monitors the total current drain of this USB equipment, i.e., current i01 flowing through the power line ps102 and which controls current i02 so that the sum of the current i02 flowing in power line ps106 to battery charge control part 115 described below and device-operating current i03 for device operation except for battery charging is less than the abovestated set value of current limiter 111. This setting makes the charging current to the battery 116 smaller than a value obtained by subtracting the device-operating current i03 from the aforementioned set value iL1 of current limiter 111.

Numeral 113 indicates a current limiter (2), which is set at such a value iL2 that the current input through the power line ps103 becomes less than a difference between the aforementioned set value iL1 of current limiter 111 and the maximum of current i03a to the power control block 10; whereby the current supplied to the power control block 10 can be assured by the current from the USB connector 100 even if the current i05 to the power block 20 detailed below becomes transiently large.

Numeral 114 designates a power switching part, which supplies the current from power line ps104 and power line ps109 to the power block 20 through power line ps105. On this occasion, when the current i05 to the power block 20 is greater than the aforementioned set value iL2 of current limiter 113, control is made so that the insufficient current is supplied via the power line ps109 from the battery 116 and output voltage adjustment part 117. At this time, the sound will be heard as distorted if the current supply to the power block 20 is insufficient because of undercharge of the battery 116.

Numeral 115 denotes a charge control part, which receives the current supply from the output ps106 of the current detection part 112 and which controls the charge to the battery 116 through the charge power line ps107. Here the battery 116 is a rechargeable, secondary battery, which is charged through the charge power line ps107 and which supplies power through output line ps108.

Numeral 117 represents an output voltage adjustment part, which adjusts the voltage of ps108 outputted from the battery 116 to a value a little smaller than the voltage of the aforementioned input power line ps102 and which outputs the adjusted voltage to the aforementioned power switching part 114 through the power line ps109.

The change in the current drain i03a in the above power control block 10 is extremely smaller than that in the power amplifiers 103L, 103R, can be absorbed by a small-capacitance capacitor, so called a bus controller, and is substantially constant.

On the other hand, the power block 20 is composed of the left and right power amplifiers 103L, 103R, in which the current drain i05 varies largely depending upon the voice input and can exceed 500 mA, which is the standard of USB.

Figure 12:
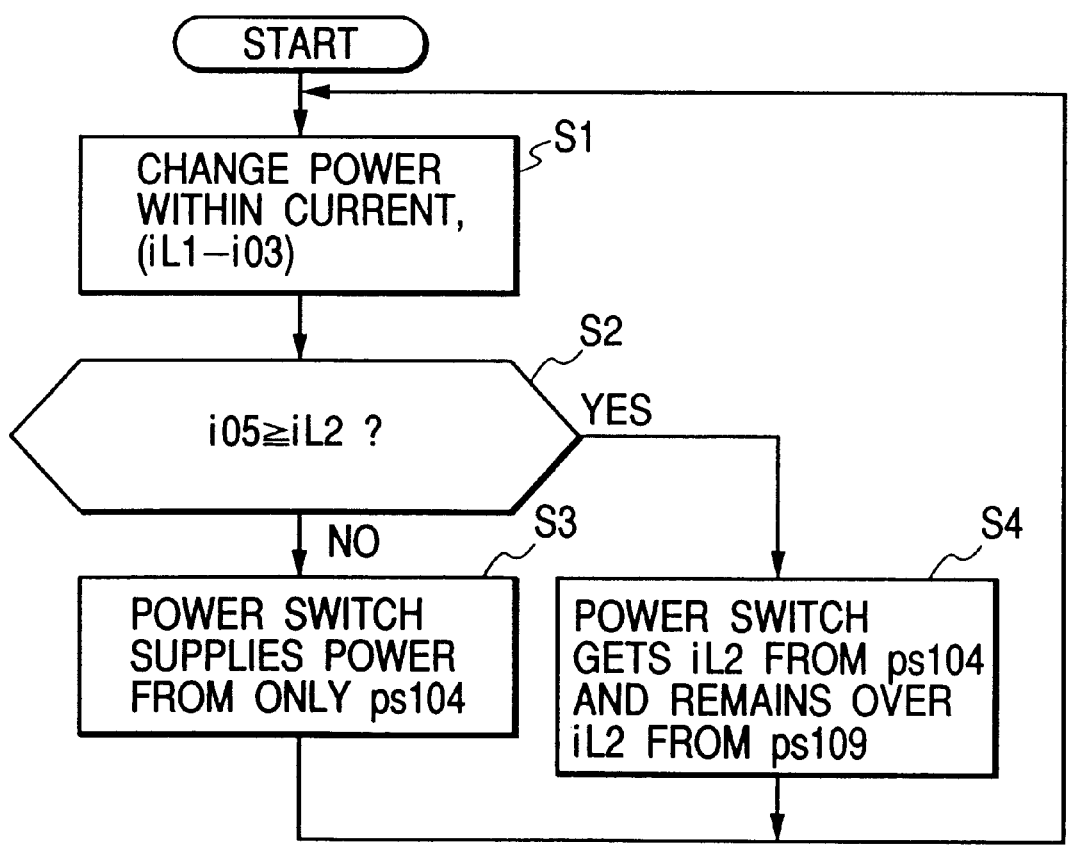
FIG. 12 is a flowchart to show the operation of the third embodiment.

The action of the third embodiment will be described next referring to the flowchart of FIG. 12.

When the equipment is activated (to start the supply of power and data via the USB connector 100), step S1 is first carried out to charge the battery 116 by the current within (iL1−i03). As described above, iL1 is the set value of current limiter 111 and i03 is the operating current value of the equipment. At this time, supposing that i03 becomes equal to iL1, the charge is interrupted and the maximum current supplied from the USB connector 100 is used for the action of the equipment.

Then step S2 is to monitor whether i05≧iL2. As described above, i05 is the current drain of the power block 20 and iL2 is the set value of current limiter 113. If i05<iL2, the flow proceeds to step S3.

Since the entire current can be supplied from the USB connector 100, the power switching part 114 supplies the current only from the power line ps104.

At this time, there still remains a surplus of the supplied current from the USB connector 100 and this surplus is used for the charge of the battery 116 while being monitored in step S1.

If there occurs an event of i05≧iL2, the flow goes to step S4. Since the supplied current from the USB connector 100 is short by (i05−iL2), the power switching part 114 supplies the current of the shortage from the battery 116 through the power line ps109.

In the present embodiment, as described above, the rechargeable battery 116 is mounted in the USB equipment, the battery 116 is charged when the normal power consumption is not more than the current limit value of USB, and the power is supplied from the battery 116 when the supplied current is transiently insufficient. This can realize the USB equipment that can operate only with the power supply from the USB connector 100, without degrading the performance of the equipment. Namely, the power supply of the equipment does not depend upon the supply from the other power supply than the USB interface bus, so that the USB equipment can be realized with capability of fully enjoying the convenience and simplicity of USB.

[4] Fourth Embodiment

Figure 13:
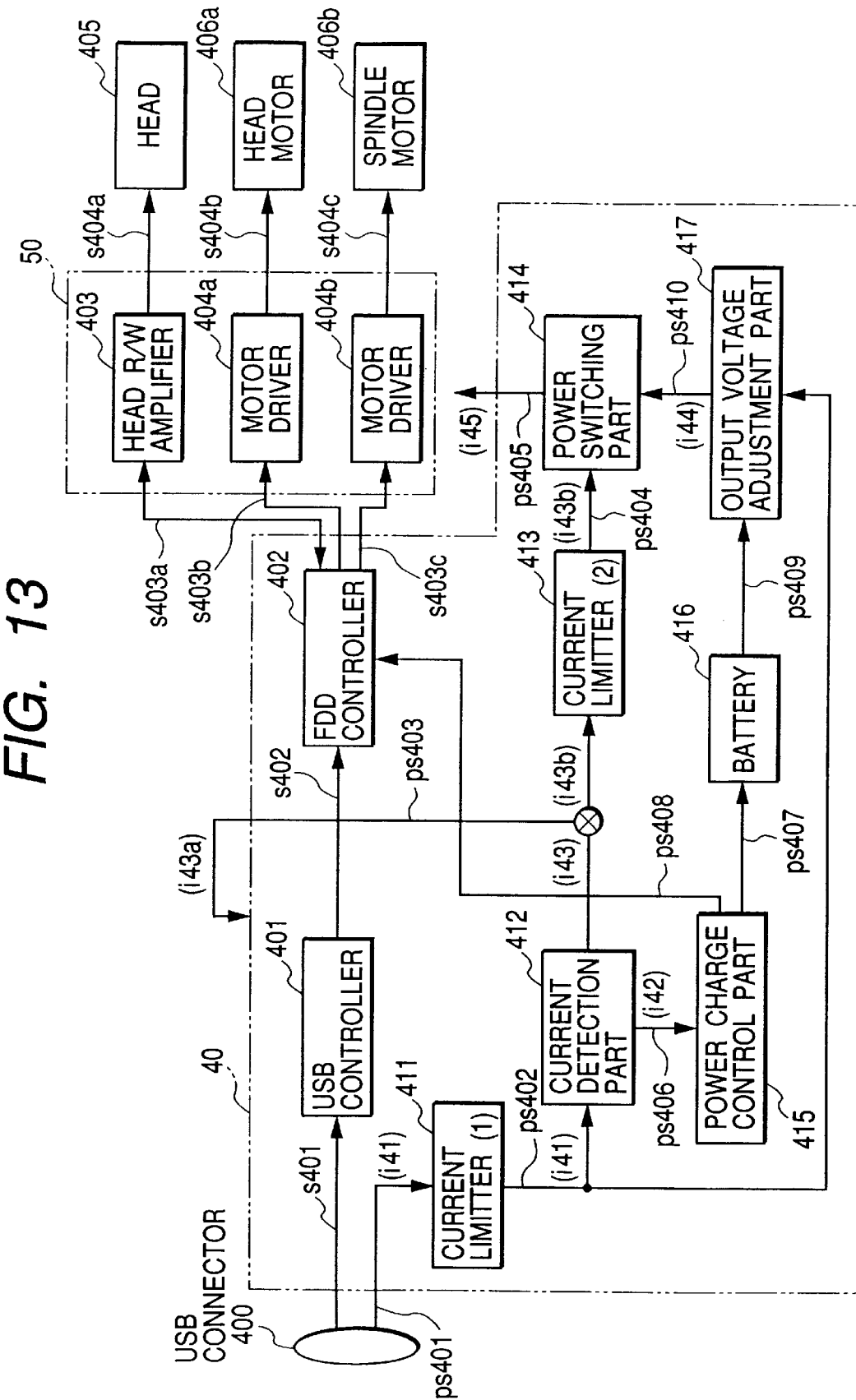
FIG. 13 is a block diagram to show an overall configuration of USB equipment according to the fourth embodiment of the present invention.

FIG. 13 is a block diagram to show the overall configuration of USB equipment according to the fourth embodiment of the present invention.

The USB equipment of the present embodiment is configured as a floppy disk drive. This floppy disk drive is an external memory device which sends and receives data via a USB connector from the host computer such as the personal computer (PC), the workstation (WS), or the like and which writes or reads the data in or from a floppy disk medium set in the device.

This floppy disk drive has power control block 40 and power block 50 and also has head 405, head motor 406a, and spindle motor 406b. (It is noted that this device may be an example of the device that cannot supply the power to the other devices, for example, as described in FIG. 1.)

In the figure numeral 400 designates a USB connector, to which USB signal line s401 and power line ps401 are assigned. In the power control block 40, numeral 401 designates a USB controller, which sends or receives data to or from the host computer through USB signal line s401, which separates information necessary for a floppy disk controller (hereinafter referred to as an FDD controller), and read-write data of the floppy disk medium, and which outputs the data to signal line s402.

Numeral 402 denotes an FDD controller, which accepts the input of signal from the signal line s402 and which executes output of control signals of various motors etc. necessary for control of the floppy disk, output of write data into the floppy medium, and input of read data via s403a, s403b, and s403c.

The FDD controller accepts input of information about battery 416 via information power line ps408 from charge control part 415 and also makes a judgment about whether the current supply to the power block 50 is insufficient because of undercharge of the battery 416.

Numeral 403 represents a write/read (W/R) amplifier for a floppy data head, which writes or reads data in or from the floppy disk medium via s403a and s404a.

Symbols 404a, 404b denote motor drivers for control of the floppy disk, which are controlled via signal lines s403b, s403c and which drive the head motor 406a and spindle motor 406b.

Numeral 405 indicates a floppy data read/write head, which reads or writes data of the floppy disk via the R/W amplifier 403. Symbol 406a denotes a motor for movement of the read/write head 405, which is driven by the motor driver 404a to move the head 405 to a position necessary for reading/writing of the floppy medium.

Symbol 406b represents a spindle motor for rotation of the floppy disk, which is driven by the motor driver 404b and which is used for rotating the floppy disk on the occasion of reading/writing of the floppy medium. Numeral 411 designates a current limiter (1), which limits the power-supply current supplied via the power line ps401 from the USB connector 400. This is set at a value iL41 a little smaller than the maximum power-supply current 500 mA, which is the standard of USB.

Numeral 412 indicates a current detection part, which monitors the whole current drain of the equipment in the present embodiment, i.e., current i41 flowing in power line ps402 and which controls current i42 so that the sum of the current i42 flowing in power line ps406 to charge control part 415 and device-operating current i43 for operation of the equipment except for charging of battery 416 is less than the set value of the current limiter 411. This makes the charge current to the battery 416 smaller than a value obtained by subtracting the device-operating current i43 from the set value iL41 of the current limiter 411.

Numeral 413 is a current limiter (2), which is set at such a value iL42 that the current input from the power line ps403 is less than a difference between the set value iL41 of current limiter 411 and the maximum of current i43a to the power control block 40; whereby the current to the power control block 40 can be assured by the current from the USB connector 400 even if the current i45 of the power block 50 described below becomes transiently large upon activation of the motor.

Numeral 414 denotes a power switching part, which supplies the current from power line ps404 and power line ps410 to the power block 50 via power line ps405.

On this occasion, when the current i45 to the power block 50 exceeds the set value iL42 of the current limiter 413, control is made so that the current of the shortage is supplied via the power line ps410 from the battery 416 and output voltage adjustment part 417.

Numeral 415 stands for a charge control part, which receives the current supply from the output ps406 of the current detection part, which controls the charge to battery 416 via charge power line ps407, and which monitors the remainder of the battery 416 to output the information via the information power line ps408. Here the battery 416 is a rechargeable, secondary battery, which is charged via the charge line ps407 and which supplies power via output line ps409.

Numeral 417 denotes an output voltage adjustment part, which adjusts the voltage of output ps409 from the battery 416 to a value a little smaller than the voltage of the input power line ps402 and which outputs the adjusted voltage via power line ps410 to the power switching part 414.

The change of the current drain i43a in the above power control block 40 is extremely smaller than that in the R/W amplifier 403 and various drivers 404a, 404b, can be absorbed by a small-capacitance capacitor, and is substantially constant.

On the other hand, the power block 50 is composed of the R/W amplifier 403 and various drivers 404a, 404b, in which the current drain i45 varies large, depending upon activation of the floppy disk, the seek operation of the head, etc. and can exceed 500 mA which is the standard of USB.

Figure 14:
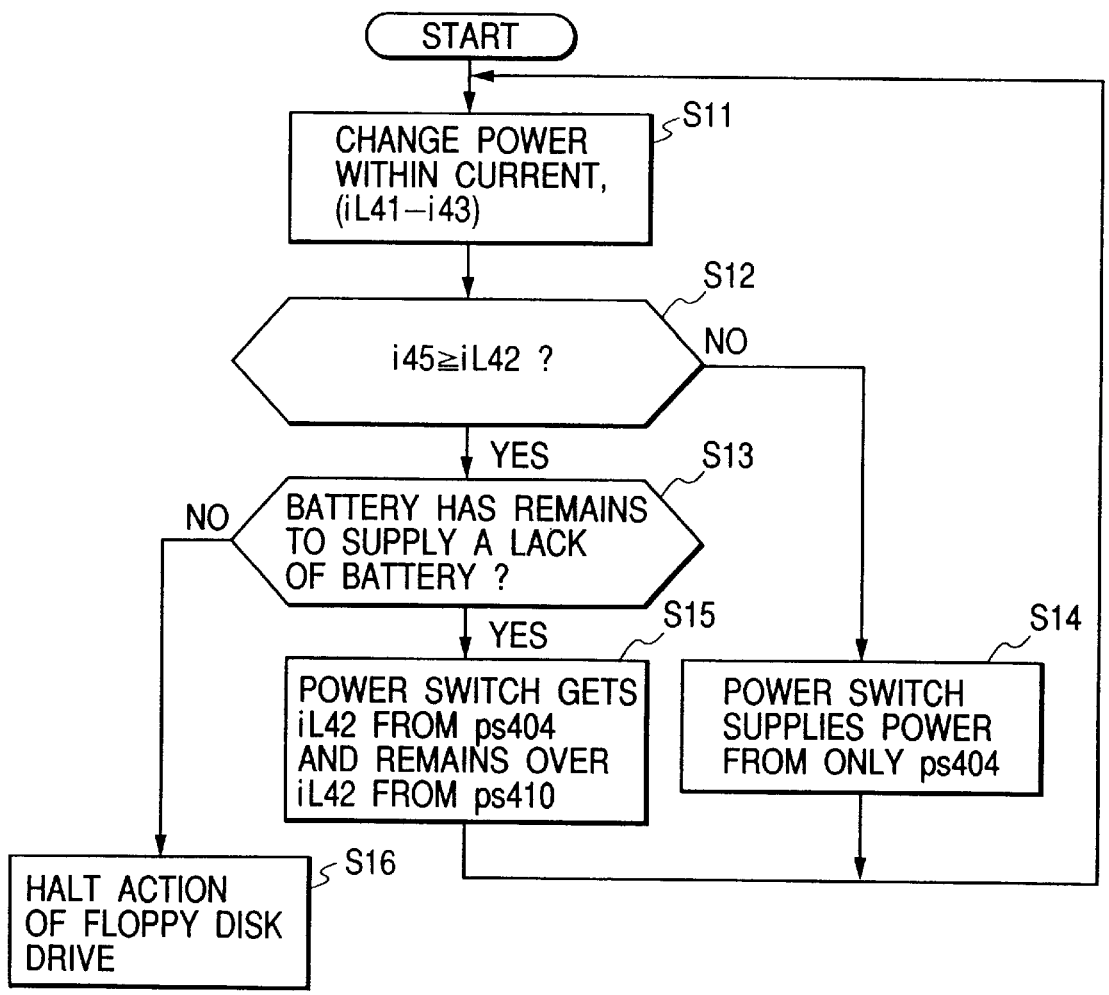
FIG. 14 is a flowchart to show the operation of the fourth embodiment.

The action of the fourth embodiment will be described next referring to FIG. 14.

When the equipment is activated, step S11 is first carried out to charge the battery 416 by the current within (iL41−i43). As described above, iL41 is the set value of current limiter 411 and i43 is the operating current value of the equipment. At this time, supposing i43 becomes equal to iL41, the charging is interrupted and the maximum current supplied from the USB connector 400 is used for the action of the equipment.

Then step S12 is to monitor whether $i45 \geq iL43$. As described, i45 is the current drain of the power block 50 and iL43 is the set value of current limiter 413.

If $i45 < iL43$, the flow proceeds to step S14. Since the whole current can be supplied from the USB connector 400, the power switching part 414 supplies the current only from the power line ps404. At this time, there still remains a surplus of the supplied current from the USB connector 400, so that this is monitored in step S11 to be used for charging of the battery 416.

When an event of $i45 \geq iL42$ occurs, the supplied current from the USB connector 400 becomes short by (i45−iL42). In this case, the flow proceeds to step S13, in which the FDD controller 402 determines whether the battery 416 can afford the power to the various motors 406a, 406b for driving of the floppy disk and the power for driving of the R/W amplifier 403 of the head 405.

When it is determined that the battery 416 has sufficient power, the flow proceeds to step S15, in which the FDD controller 402 drives the various motors 406a, 406b for driving of the floppy disk and the R/W amplifier 403 of the head 405. On this occasion the power switching part 414 supplies the current of the shortage from the battery 416 via the power line ps410.

When it is determined that the battery 416 cannot afford the power, the flow proceeds to step S16, in which the FDD controller 402 determines that an anomaly occurs in the device, halts the action of the floppy disk, transfers the information to the host computer, and awaits instructions.

The present embodiment can also accomplish the effect equivalent to that of the above third embodiment. Namely, the equipment of the present embodiment is so configured that the rechargeable battery is mounted in the main body, that the battery is charged while the power consumption of the equipment is lower than the supplied power, and that the charged battery supplements the transient shortage power of the equipment; whereby the present embodiment can provide the USB equipment that can be operated by only the power supply from the USB connector, without degrading the performance of the equipment.

[5] Fifth Embodiment

Figure 15:
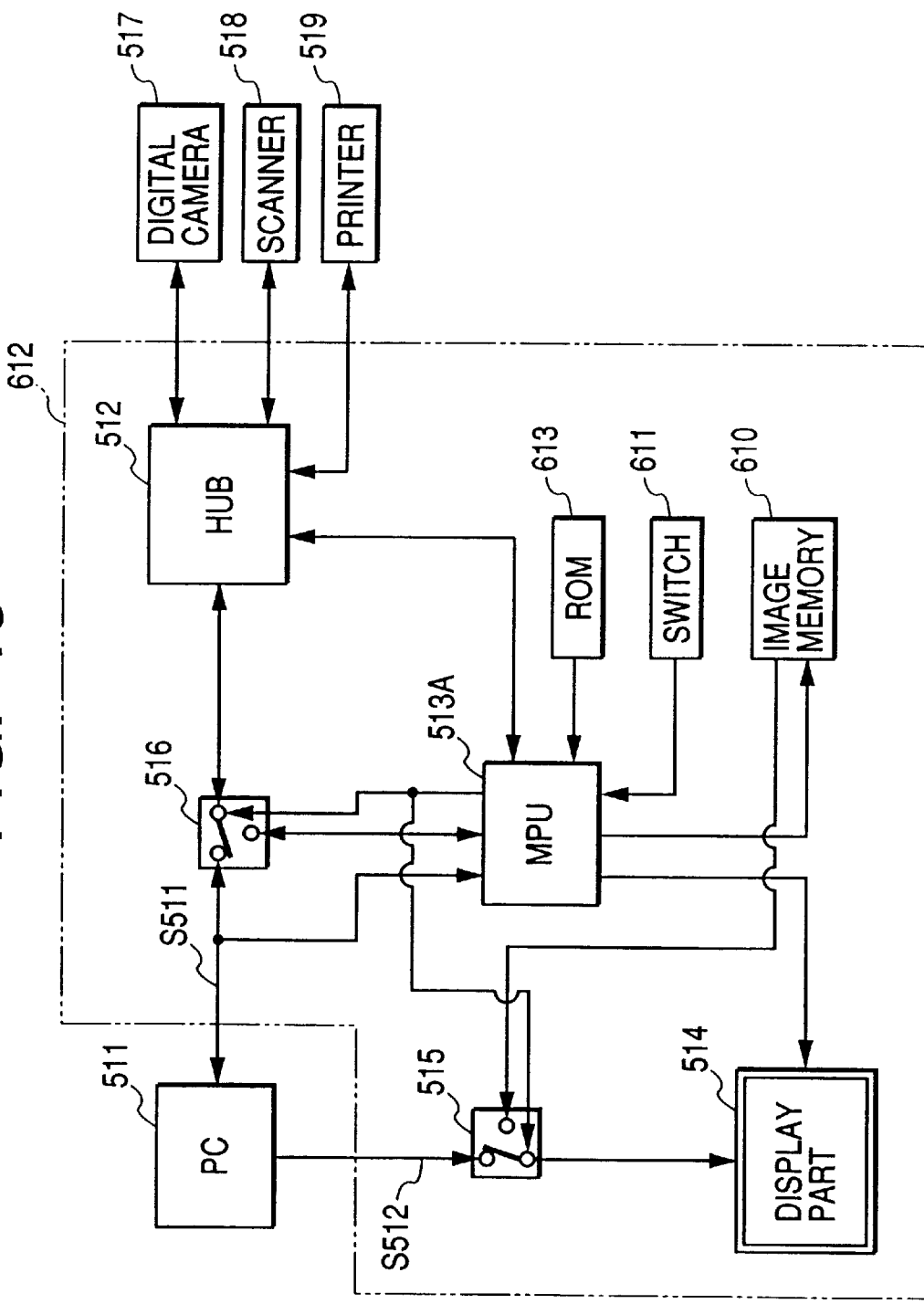
FIG. 15 is a block diagram to show an overall configuration of a display device incorporating a display control device according to the fifth embodiment of the present invention.
Figure 23:
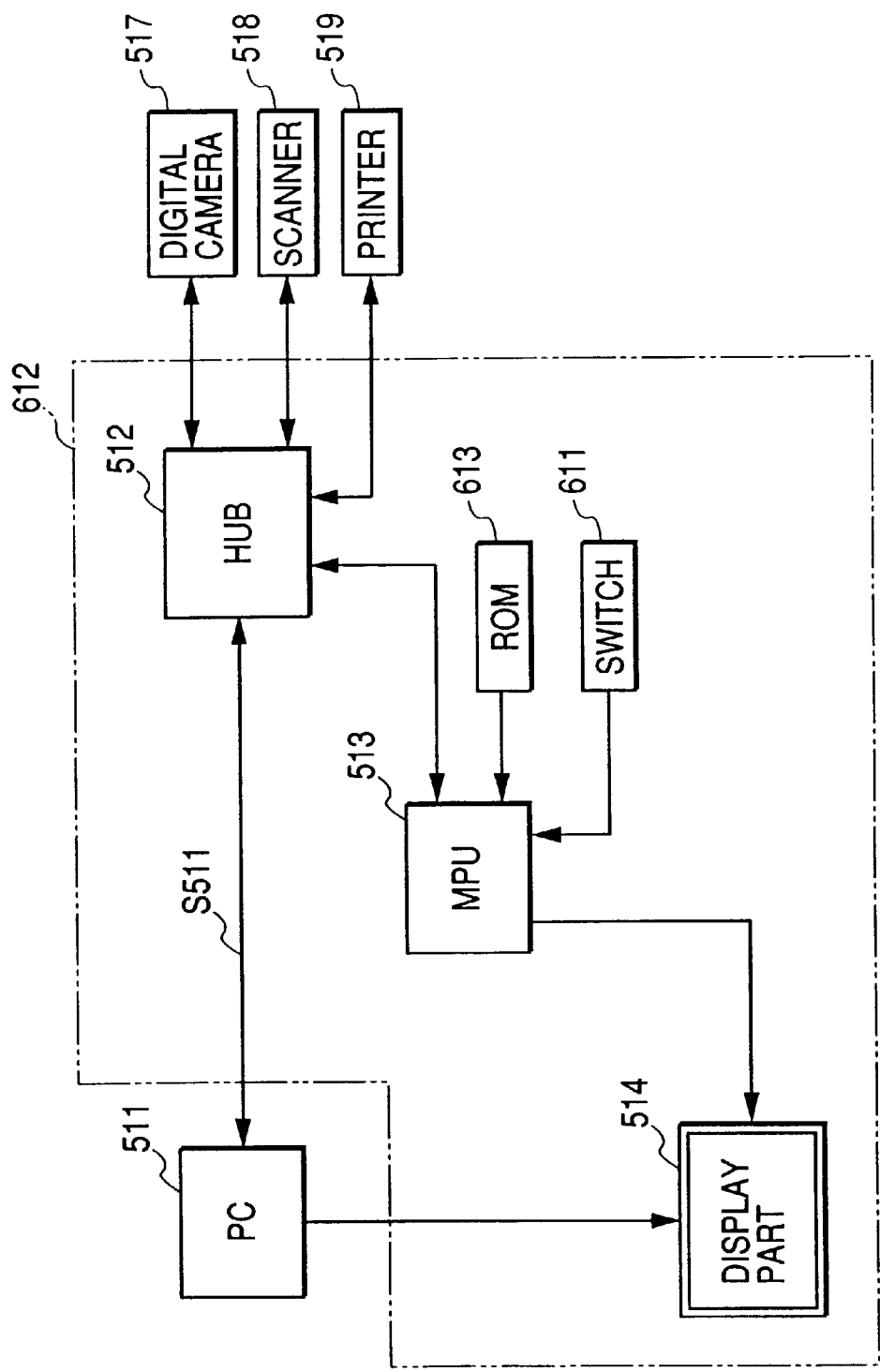
FIG. 23 is a block diagram to show a configuration of the conventional display device.

FIG. 15 is a block diagram to show the overall configuration of a display device incorporating a display control device according to the fifth embodiment of the present invention, in which the common elements to FIG. 23 are denoted by the same reference symbols.

This display device 612 has hub 512, display part 514, switch 611, and ROM 613, as in the conventional example, and is also provided with MPU 513A, image changeover switch 515, bus changeover switch 516, and image memory 610, which are features of the present embodiment.

The MPU 513A is activated after receipt of supply of various programs from ROM 613. Further, the MPU 513A monitors data signal S511 from the PC 511 and detects an energized state of the PC 511 by this data signal S511 when the power of PC 511 is on.

Once the MPU 513A detects the energized state of data signal S511 from the PC 511, it sets the bus changeover switch 516 in a state in which the PC 511 is connected to the hub 512 and also sets the image changeover switch 515 so that the display part 514 displays image signal S512 from the PC 511.

After completion of such setting, the hub 512 transmits the data of the PC 511 from the bus changeover switch 516 to digital camera 517, scanner 518, printer 519, and MPU 513A connected to the hub 512 according to the necessity.

Further, the hub also transmits data to the PC 511 from the digital camera 517, scanner 518, printer 519, and MPU 513A connected to the hub 512, to the bus changeover switch 516.

The digital camera 517 accepts the specification command to specify the photography and image number, the specification command to specify the image data etc., or data from the PC 511 via the hub 512 and sends data including the image data etc. and data including the photography conditions etc. to the PC 511 via the hub 512. The scanner 518 accepts the resolution, position, and range of scan, commands, etc. from the PC 511 via the hub 512 and sends image data to the PC 511 via the hub 512. The printer 519 accepts the control commands and printing data from the PC 511 via the hub 512 to perform printing and sends the printer status to the PC 511 via the hub 512.

The MPU 513A accepts various set values of the display part 514 from the PC 511 via the hub 512 and sends the monitor status to the PC 511 via the hub 512. The MPU 513A can also accept input of various set values from the switch 611 and performs setting of the display part 514 using the various set values thus accepted.

The display part 514 undergoes various adjustments from the MPU 513A and accepts the image data from the image changeover switch 515 to present the display thereof.

When the power of PC 511 is off, the monitoring of data signal S511 by the MPU 513A finds that the data signal S511 from the PC 511 is in a non-energized state. When the MPU 513A detects that the data signal S511 from the PC 511 is in the non-energized state, it sets the bus changeover switch 516 in a state in which the MPU 513A is connected to the hub 512 and also sets the image changeover switch 515 so that the display part 514 displays the image from the image memory 610.

After completion of such setting, the hub 512 transmits the data of the MPU 513A via the bus changeover switch 516 to the digital camera 517, scanner 518, printer 519, and MPU 513A connected to the hub 512 according to the necessity. Further, the bus also transmits the data from the digital camera 515, scanner 518, printer 519, and MPU 513A, connected to the hub 512, to the MPU 513A via the bus changeover switch 516.

The digital camera 517 accepts the specification command to specify the photography and image number, the specification command to specify the image data etc., or data from the MPU 513A via the hub 512 and sends the data including the image data etc. and the data including the photography conditions etc. to the MPU 513A via the hub 512. The MPU 513A stores the image data thus accepted, in the image memory 610 and thereafter sends it to the image changeover switch 515.

The scanner 518 accepts the resolution, position, and range of scan, and the commands etc. from the MPU 513A via the hub 512 and sends the image data to the MPU 513A via the hub 512. The MPU 513A stores the image data thus accepted, in the image memory 610 and then sends the image data to the image changeover switch 515.

The printer 519 accepts the control commands and the image data of image memory 610 from the MPU 513A via the hub 512 to perform printing and sends the printer status to the MPU 513A via the hub 512. The MPU 513A accepts the various set values of the display part 514 from the MPU 513A via the hub 512 and sends the monitor status to the MPU 513A via the hub 512. Further, the MPU 513A can accept input of various set values from the switch 611 and executes setting of the display part 514 using the various set values thus accepted.

The display part 514 undergoes the various adjustments from the MPU 513A and accepts the image data via the image changeover switch 515 to present the display thereof.

Detecting that the power of the PC 511 becomes on during the aforementioned action in the power off state of the PC 511, the MPU 513A interrupts all processing actions and immediately switches them to those where the power of the PC 511 is on.

Figure 16:
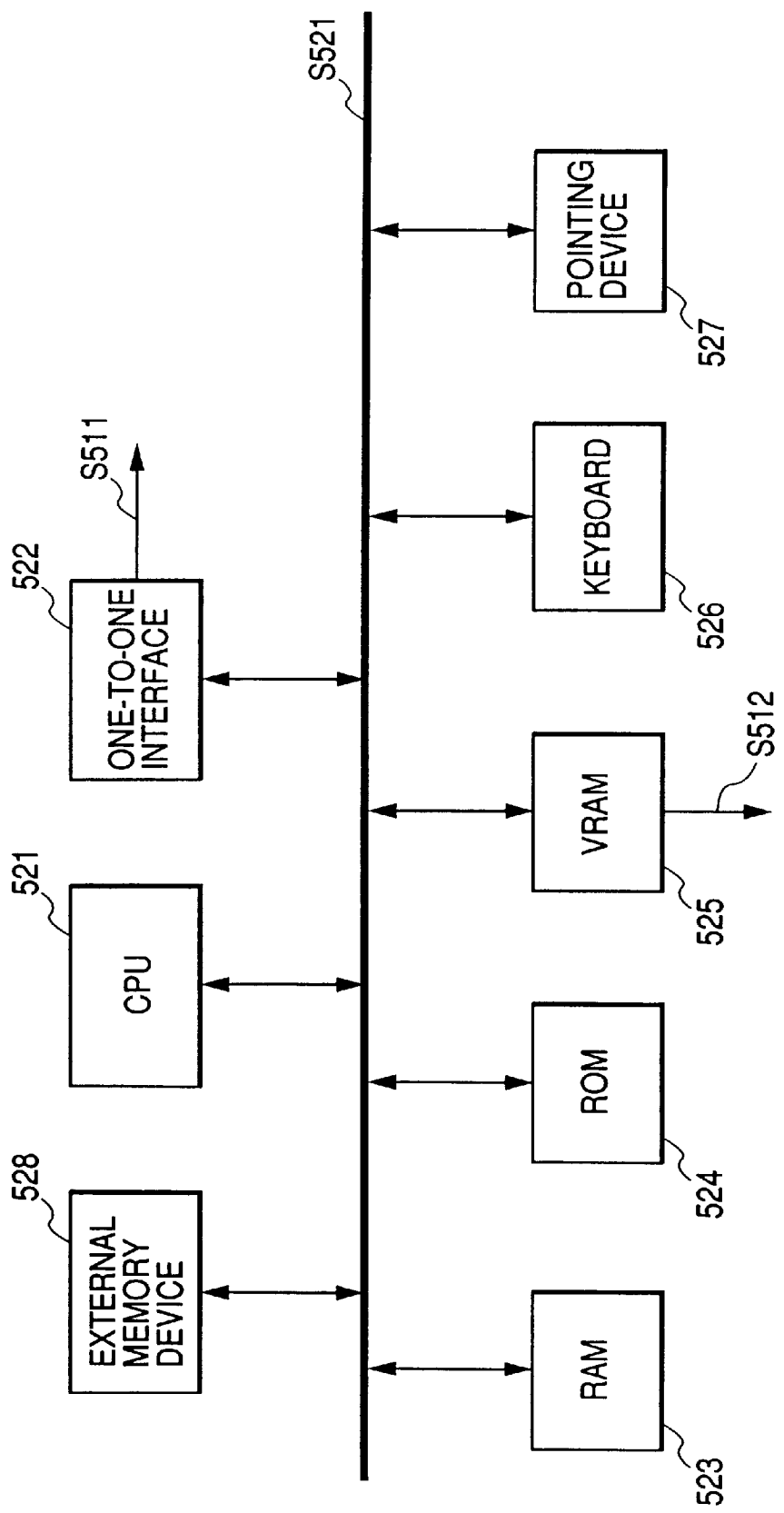
FIG. 16 is a block diagram to show a configuration of PC 511.

FIG. 16 is a block diagram to show the configuration of the PC 511.

This PC 511 is controlled by CPU 521 which is a control processing unit. The CPU 521 sends or receives data and programs to or from various peripheral devices via system bus S521.

First, the CPU 521 receives supply of the basic program from ROM 524 and transfers a predetermined program from external memory device 528 to RAM 523 to execute the aforementioned program, thereby performing a desired action.

An operator gives directions to the PC 511, using keyboard 526 as a key input device and using pointing device 527 as a coordinate input device. Information to the operator is given in such a manner that the CPU 521 writes data in VRAM 525 according to the program and an image signal S512 outputted from the VRAM 525 is displayed on the display part 514 of the display device 612.

According to instructions of the program, the PC executes the various adjustments of the display part 514 as described above and the transfer of data to or from the digital camera 517, scanner 518, and printer 519 via one-to-one interface 522.

Figure 17:
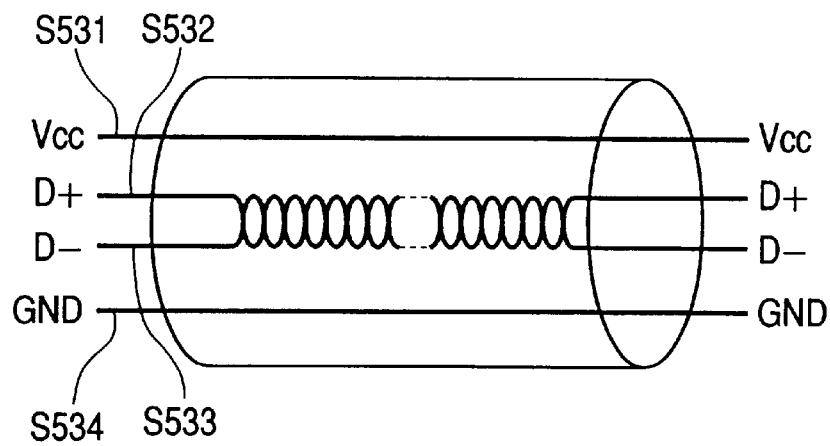
FIG. 17 is a block diagram to show a configuration of data signals from PC 511.

FIG. 17 is a block diagram to show the structure of data signals from the PC 511.

In the same figure, power signal S531 is a power supply signal to a device connected downstream, and the MPU 513A detects presence/absence of energization by detecting voltage of the signal. Positive data signal S532 and negative data signal S533 are data signals of mutually different polarities and the signals are used as a twist pair, thereby enhancing reliability of data. Ground signal S534 is a signal to indicate the ground.

Figure 18:
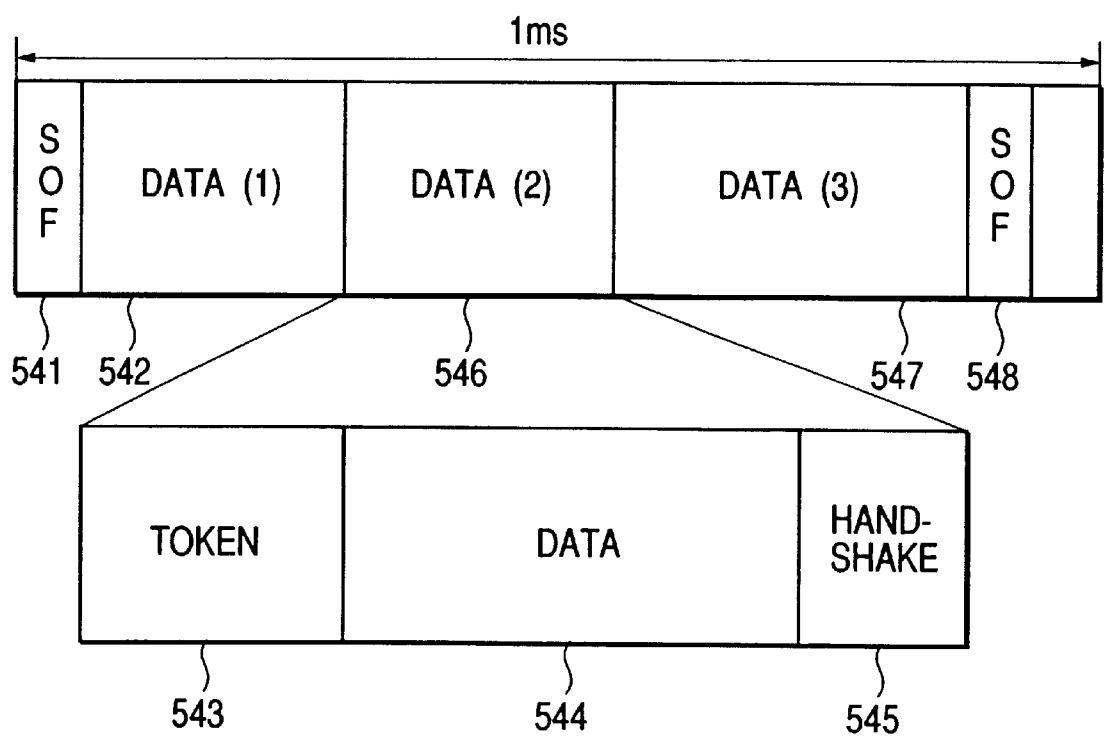
FIG. 18 is a schematic diagram of a data transfer frame of a data signal sent from PC 511.

FIG. 18 is a schematic diagram of a data transfer frame of the data signal sent from the PC 511.

In the same figure, the frame is composed of SOF 541 indicating the start of the frame, and data packets, and the data packets consist of data packet (1) 542, data packet (2) 543, data packet (3) 544, and plural data. The frame ranges from SOF 541 to the start of the next SOF 548, and is in time division every 1 ms.

The data packet (2) 546 is composed of token 543, data 544, and handshake 545, and the other data packet (1) 542 and data packet (3) 547 have the same structure. The token 543 is composed of a packet ID to indicate a direction of data and a type of the packet, an address to indicate a number of a destination, an END point to indicate the size of the packet, and CRC. Further, the data 544 is the main body of data desired to transfer, which is composed of bytes indicated by the aforementioned END point, and the handshake 545 returns data transactions of successful data reception, flow control, and halt condition.

According to the present embodiment, as described above, the device can operate as before when the computer is connected and when the power of the computer is on, and the operation of display, printing, or the like can also be performed even if the computer is disconnected or even if the power of the computer is off.

[6] Sixth Embodiment

The above fifth embodiment was the example in which the control program was stored in the ROM 613, whereas the present embodiment is an example in which the control program is not stored in the ROM 613.

Figure 19:
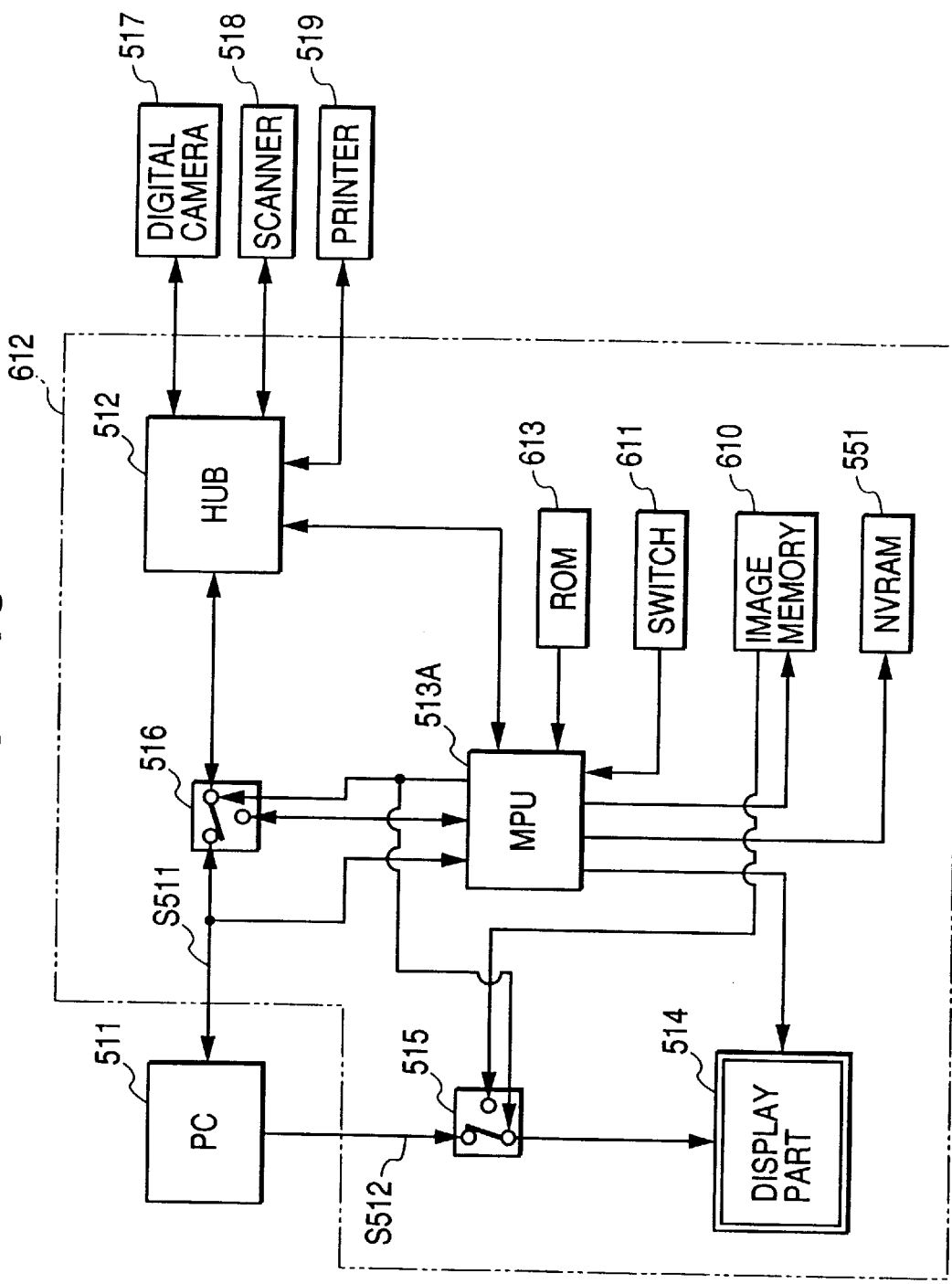
FIG. 19 is a block diagram to show an overall configuration of a display device incorporating a display control device according to the sixth embodiment of the present invention.

FIG. 19 is a block diagram to show the overall configuration of the display device incorporating the display control device according to the sixth embodiment of the present invention, in which the common elements to FIG. 15 are denoted by the same reference symbols.

In the present embodiment, NVRAM 551 for storage of program is added to the system configuration of FIG. 15.

The program is transferred first in the power on state of PC 511. In PC 511 the program is read out of the external memory device 528 and is transferred via the one-to-one interface 522 and via the bus changeover switch 516 and hub 512 to the MPU 513A.

The MPU 513A stores the program thus received, in NVRAM 551 capable of retaining the program even in the power off state. Detecting power on of the PC 511, the MPU 513A executes the actions similar to those in the fifth embodiment described above.

While the power of the PC 511 is off, the necessary information is transferred to the digital camera 517, scanner 518, printer 519, and MPU 513A connected to the hub 512, using the program in the NVRAM 551, in the case where the program is not stored in the ROM 613.

[7] Seventh Embodiment

The above sixth embodiment was the example in which the program was transferred from the PC 511 where the program was not stored in the ROM 613, whereas the present embodiment is an example in which the program is transferred from a device connected to the hub 512.

Figure 20:
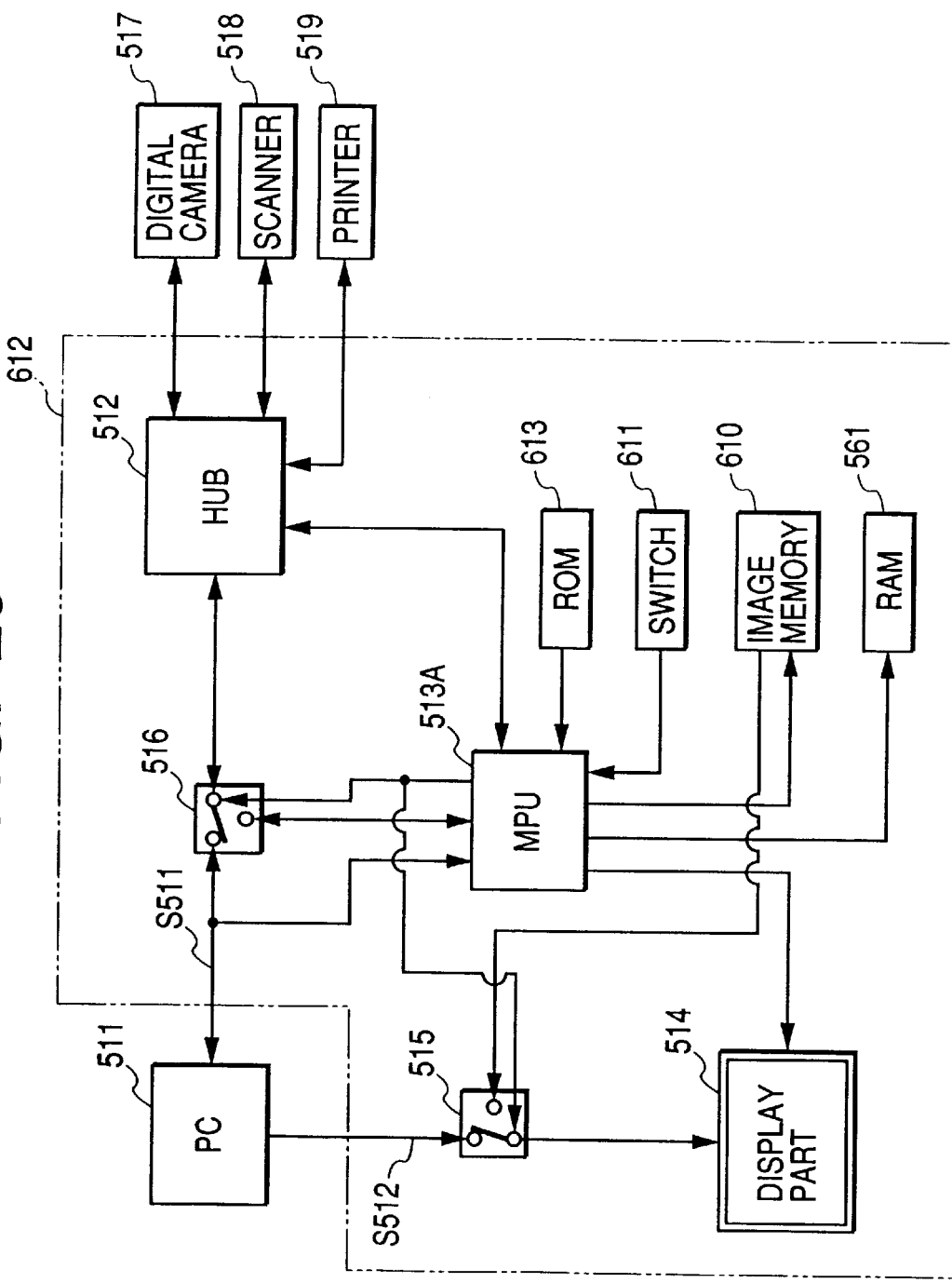
FIG. 20 is a block diagram to show an overall configuration of a display device incorporating a display control device according to the seventh embodiment of the present invention.

FIG. 20 is a block diagram to show the overall configuration of the display device incorporating the display control device according to the seventh embodiment of the present invention, in which the common elements to FIG. 15 are denoted by the same reference symbols.

In the figure, the NVRAM 551 illustrated in FIG. 19 is replaced by RAM 561. In the present embodiment, each of the digital camera 517, scanner 518, and printer 519 stores a transfer control program. The actions except for the program transfer method are the same as those in the above sixth embodiment.

When there appears a first request for a device desired to transfer information, among the devices connected to the hub 512, the MPU 513A receives the control program transferred from the device according to predetermined procedures independent of the device.

The MPU 513A stores the transferred program in the RAM 561, sends or receives the information to or from the device connected to the hub 512 by use of the program, and executes the predetermined control of image data, printing, or the like.

Figure 21:
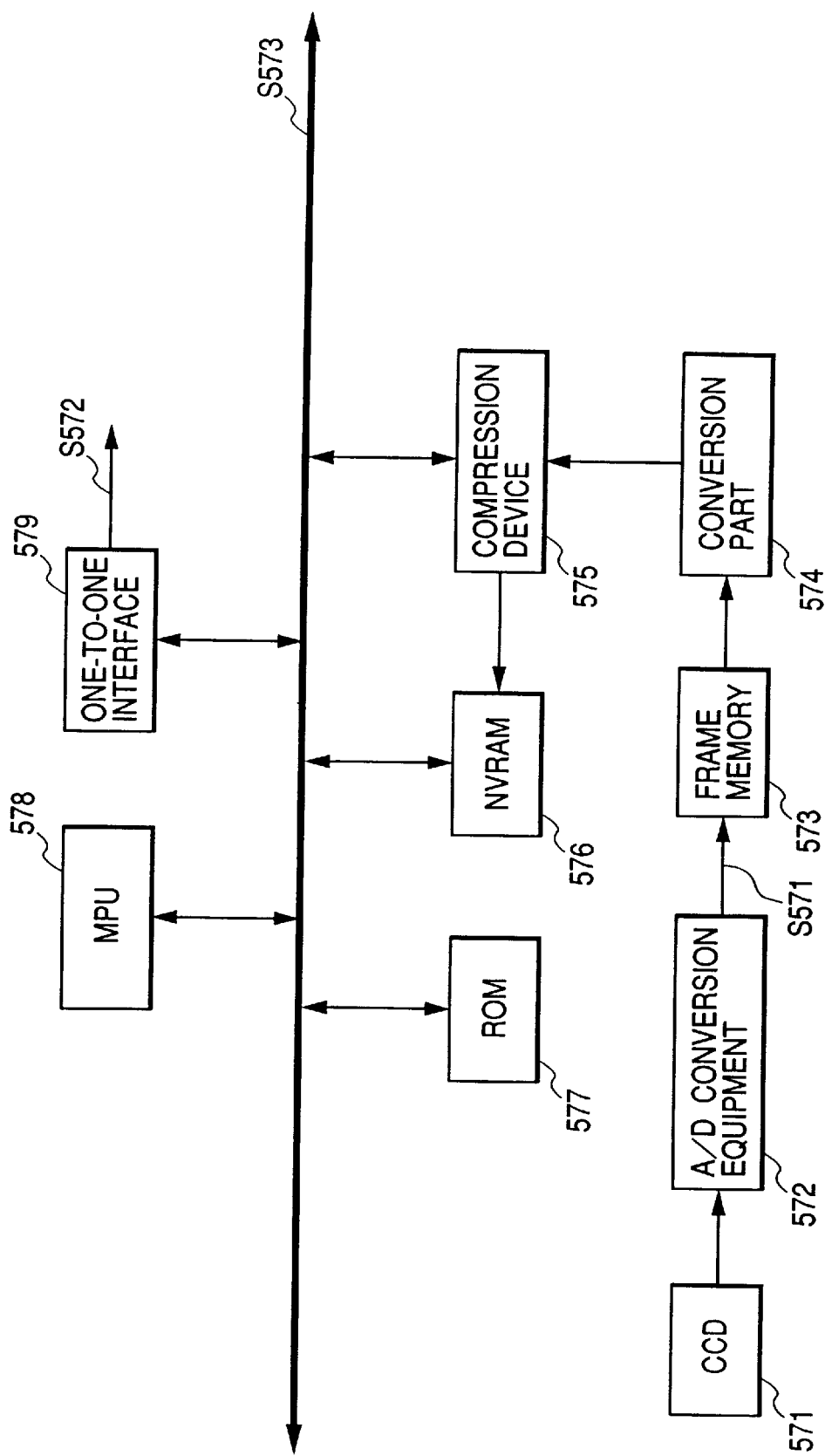
FIG. 21 is a block diagram to show a configuration of digital camera 562.
Figure 22:
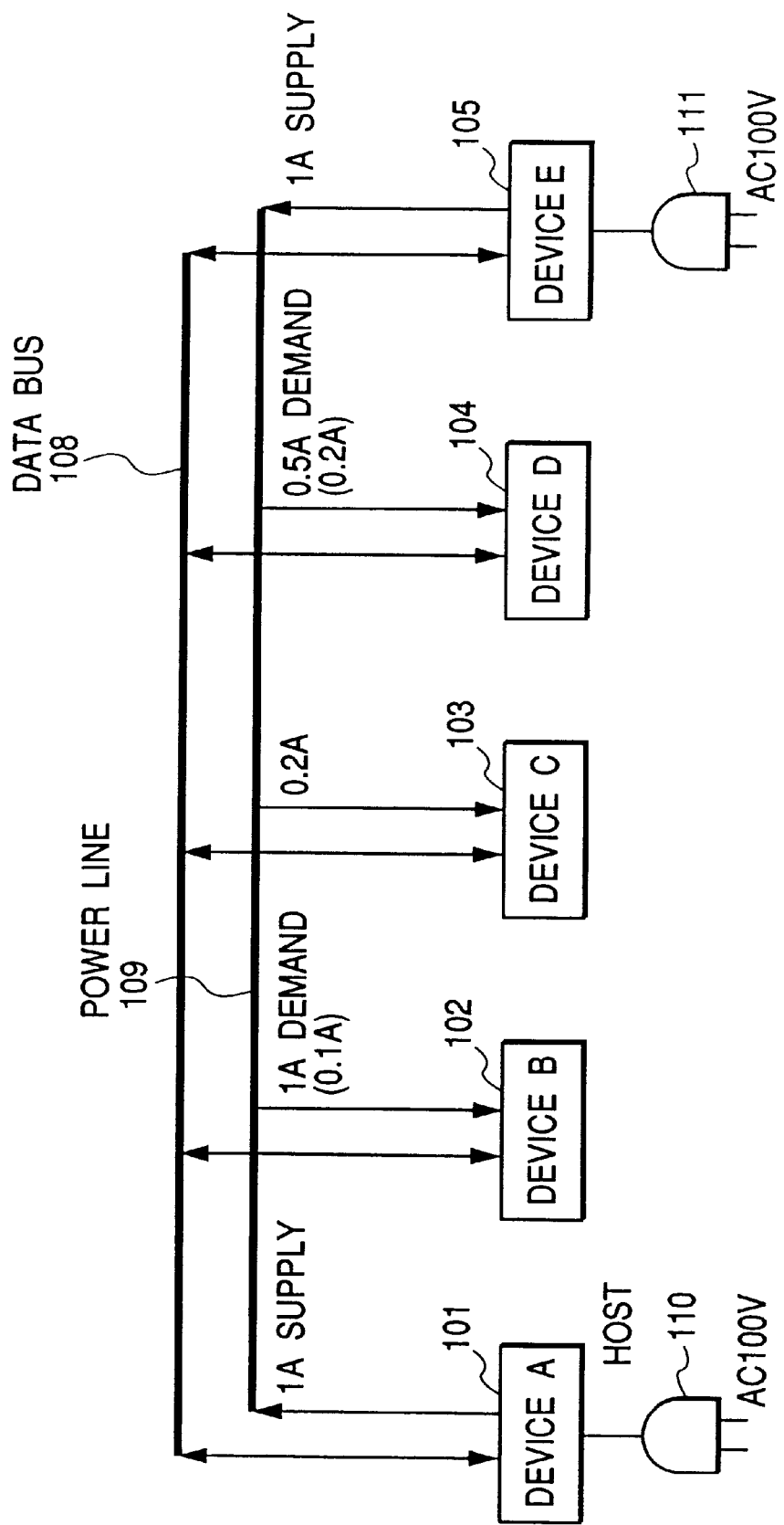
FIG. 22 is a block diagram to show a configuration example of the system according to the conventional example.

FIG. 21 is a block diagram to show the structure of the digital camera 517 (FIG. 20).

This digital camera 517 has MPU 578. The MPU 578 sends or receives data via MPU bus S573 and sends or receives data via data line S572 to or from the hub 512.

When the one-to-one interface 579 receives a request packet via the hub 512 from the MPU 513A of the display device 612 to the MPU 578, the MPU 578 reads the requested program out of the ROM 577 and sends it to the MPU 513A via the one-to-one interface 579 and hub 512.

When the MPU 513A gives a request for photography and image data to NVRAM 576 according to the program thus sent, the MPU 578 accepts the request via the one-to-one interface 579. Then A-D converter 572 converts an analog image of CCD 571 to a digital signal and the data of Y-U form is stored as data of one screen in frame memory 573 via S571. Further, RGB conversion part 574 converts the read data out of the frame memory 573 into data of RGB form and compression device 575 compresses the data according to the JPEG compression method and stores the compressed data in the NVRAM 576.

When the MPU 513A sends a transfer request for transfer of the image data stored, the MPU 578 accepts the request via the one-to-one interface 579, reads the image data out of the NVRAM 576, and transfers the image data to the MPU 513A via the one-to-one interface 579 and hub 512.

The present invention can be applied not only to systems composed of plural devices, but also to apparatus comprised of a single device, without having to be limited to the apparatus of the embodiments described above. It is needless to mention that the present invention can also be completed by a memory medium storing the program code of software for realizing the functions of the aforementioned embodiments in such a way that it is supplied to the system or the apparatus and that the computer (or the CPU or the MPU) in the system or the apparatus reads the program code stored in the memory medium and carries out the program.

In this case, the program code itself read out of the memory medium implements the functions of the embodiments described above and the memory medium storing the program code constitutes the present invention. The memory medium for supply of the program code can be one selected, for example, from a floppy disk, a hard disk, an optical disk, a magnetooptical disk, a CD-ROM, a CD-R, a magnetic tape, a non-volatile memory card, and an ROM. It is also needless to mention that the present invention embraces applications where the computer carries out the program code read out to implement the functions of the embodiments described above, and applications where OS or the like working on the computer carries out part or all of the actual processing according to the instructions of the program code and the processing implements the functions of the aforementioned embodiments.

Further, it is also needless to mention that the present invention further includes applications where the program code read out of the memory medium is written into a memory in a function extension board put in the computer or in a function extension unit connected to the computer, thereafter the CPU or the like in the function extension board or in the function extension unit carries out actual processing according to the instructions of the program code to execute part or all of the actual processing, and the processing implements the functions of the aforementioned embodiments.

What is claimed is:

1. A system in which a plurality of devices driven by supply of power are connected, each of at least two devices out of the plurality of devices comprising:

memory means for storing common history information of each device connected to said system; and first control means for altering, when the present device configuration of said system is altered to a new device configuration, the common history information of the present device configuration in all of said memory means to new common history information reflecting the new device configuration.

2. A system according to claim 1, wherein each of said at least two devices can be a primary host device having a primary host function or a secondary host device having a secondary host function, wherein, when one of said at least two devices is serving as the primary host and the other of said at least two devices is serving as the secondary host and the primary host device is disconnected from the system, said first control means of the secondary host device sets the secondary host device as a new primary host device, and wherein, when the secondary host device is disconnected from the system, said first control means of the primary host device designates another device as a new secondary host device.

3. A system according to claim 1, wherein each of said at least two devices further comprises second control means for controlling a total demanded power of the plurality of devices so that the total demanded power does not exceed a total supplied power.

4. A system according to claim 3, wherein each of said at least two devices can be a primary host device having a primary host function or a secondary host device having a secondary host function and can transfer into a power saving mode, wherein, when one of said at least two devices is serving as the primary host and the other of said at least two devices is serving as the secondary host and the primary host device is disconnected from the system, said first control means of the secondary host device sets itself as a new primary host device and designates another device as a new secondary host device, and wherein, when the secondary host device is disconnected from the system, said first control means of the primary host device designates another device as a new secondary host device.

5. A system according to claim 1, wherein at least two devices out of the plurality of devices are a primary host device and a secondary host device.

6. A system according to claim 1, wherein at least one device out of the plurality of devices is a device capable of supplying power to the other devices, and wherein there are, mixed in the system, the device capable of supplying power and devices receiving the power from the device capable of supplying power.

7. A system according to claim 6, wherein the device capable of supplying power is a primary host device.

8. A system according to claim 6, wherein the device capable of supplying power and the devices receiving the supplied power comprise first control means for altering history information in a memory means when a configuration of the system is altered, wherein, when the configuration of the system is altered, said first control means of the device capable of supplying power reports supplied power to a primary device and said first control means of the devices receiving the supplied power reports consumed powers thereof in action and in a power saving mode to the primary host device.

9. A system according to claim 6, wherein each of the plurality of devices comprises a first control means for storing history information in a memory means when a configuration of the system is altered, wherein, when the configuration of the system is altered, said first control means of each of the plurality devices notifies the first control means of the other devices of its specific ID and that it is a primary host device or a secondary host device, said first control means of said device capable of supplying power reports supplied power thereof, and said first control means of each device receiving the power reports consumed powers thereof in action and in a power saving mode.

10. A system according to claim 4, wherein said first control means of the primary host device gives a command for entry into the power saving mode to a device of a shorter active time than others, based on the history information in said memory means.

11. A control method applied to a system in which a plurality of devices driven by supply of power are connected, comprising:

a memory step of storing common history information of each device connected to the system in memory means of at least two devices out of the plurality of devices; and a first control step of altering, when the present device configuration of the system is altered to a new device configuration, the common history information of the present device configuration in all of the memory means to new common history information reflecting the new device configuration.

12. A control method according to claim 11, wherein each of the at least two devices can be a primary host device having a primary host function or a secondary host device having a secondary host function, wherein, when one of the at least two devices is serving as the primary host and the other of the at least two devices is serving as the secondary host and the primary host device is disconnected from the system, said first control step comprises a step of setting the secondary host device as a new primary host device and designating another device as a new secondary host device, and wherein, when the secondary host device is disconnected from the system, said first control step comprises a step of designating another device as a new secondary host device.

13. A control method according to claim 11, further a comprising a second control step of controlling a total demanded power of the plurality of devices so that the total demanded power does not exceed a total supplied power.

14. A control method according to claim 13, wherein each of the at least two devices can be a primary host device having a primary host function or a secondary host device having a secondary host function and can transfer into a power saving mode, wherein, when one of the at least two devices is serving as the primary host and the other of the at least two devices is serving as the secondary host and the primary host device is disconnected from the system, said first control step comprises a step of setting the secondary host device as a new primary host device, and wherein, when the secondary host device is disconnected from the system, said first control step designates another device as a new secondary host device.

15. A control method according to claim 14, wherein said first control step comprises a step of giving a command for entry into the power saving mode to a device of a shorter active time than others, based on the history information in the memory means.

16. A computer-readable memory medium storing a program for controlling a system in which a plurality of devices driven by supply of power are connected, comprising:

a memory step of storing common history information of each device connected to the system in memory means of at least two devices out of the plurality of devices; and a first control step of altering, when the present device configuration of the system is altered to a new device configuration, the history information of the present device configuration in all of the memory means to new common history information reflecting the new device configuration.

17. A computer-readable memory medium according to claim 16, further comprising a second control step of controlling a total demanded power of the devices so that the total demanded power does not exceed a total supplied power.

* * * * *

UNITED STATES PATENT AND TRADEMARK OFFICE
CERTIFICATE OF CORRECTION

PATENT NO. : 6,715,071 B2
DATED : March 30, 2004
INVENTOR(S) : Ono et al.

It is certified that error appears in the above-identified patent and that said Letters Patent is hereby corrected as shown below:

Drawings,
Sheet 6, Figure 6, "SUPPLYED" should read -- SUPPLIED --.

Sheet 11, Figure 11, "LIMITTER (1)" should read -- LIMITER (1) --; and
Sheet 11, Figure 11, "LIMITTER (2)" should read -- LIMITER (2) --.

Sheet 13, Figure 13, "LIMITTER (1)" should read -- LIMITER (1) --; and
Sheet 13, Figure 13, "LIMITTER (2)" should read -- LIMITER (2) --.

Column 5,
Line 26, "does" should read -- has --.

Column 7,
Line 58, "511)." should read -- S111). --.

Column 11,
Line 65, "does" should read -- has --.

Column 14,
Line 61, "abovestated" should read -- above stated --.

Column 17,
Line 52, "large," should read -- largely, --

Column 24,
Line 24, "further a" should read -- further --.

Signed and Sealed this

Seventh Day of September, 2004

JON W. DUDAS
*Director of the United States Patent and Trademark Office*